United States Patent
Wu et al.

(10) Patent No.: US 11,843,638 B1
(45) Date of Patent: *Dec. 12, 2023

(54) DHCP SERVER-BASED STEERING LOGIC FOR POLICY ENFORCEMENT ON IOT DEVICES

(71) Applicant: Netskope, Inc., Santa Clara, CA (US)

(72) Inventors: David Tze-Si Wu, Fremont, CA (US); Siying Yang, Cupertino, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,389

(22) Filed: Aug. 12, 2022

Related U.S. Application Data

(60) Provisional application No. 63/349,494, filed on Jun. 6, 2022.

(51) Int. Cl.
*H04L 9/00* (2022.01)
*H04L 9/40* (2022.01)
*H04L 61/5014* (2022.01)

(52) U.S. Cl.
CPC .......... *H04L 63/20* (2013.01); *H04L 61/5014* (2022.05); *H04L 63/0876* (2013.01); *H04L 63/1425* (2013.01)

(58) Field of Classification Search
CPC . H04L 63/20; H04L 61/5014; H04L 63/0876; H04L 63/1425
USPC .......................................................... 726/1
See application file for complete search history.

(56) References Cited

U.S. PATENT DOCUMENTS

| | | |
|---|---|---|
| 8,224,761 B1 | 7/2012 | Rockwood |
| 8,578,442 B1 | 11/2013 | Banerjee |
| 9,054,860 B1 | 6/2015 | Rothschild |
| 9,860,168 B1 | 1/2018 | Seshadri |
| 10,116,535 B1 | 10/2018 | Brown et al. |
| 11,159,386 B2 | 10/2021 | Finn et al. |
| 11,283,768 B1 | 3/2022 | Li |
| 2006/0218304 A1 | 9/2006 | Mukherjee et al. |
| 2007/0186281 A1 | 8/2007 | McAlister |
| 2007/0250921 A1 | 10/2007 | Livecchi |

(Continued)

OTHER PUBLICATIONS

U.S. Appl. No. 17/887,376, filed Aug. 12, 2022, Pending.

(Continued)

*Primary Examiner* — Christopher J Brown

(57) ABSTRACT

The technology disclosed relates to a DHCP server-based steering logic for policy enforcement on IoT devices. In particular, the technology disclosed provides a steering logic running on a DHCP server on a network segment of a network. The steering logic is configured to receive DHCP requests broadcasted to the DHCP server by a plurality of special-purpose devices on the network segment, access DHCP responses generated by the DHCP server for the DHCP requests, receive, from a device classification logic, a positive determination that special-purpose devices in the plurality of special-purpose devices are special-purpose devices and not general-purpose devices, modify the accessed DHCP responses by replacing the default gateway with an inline secure forwarder on the network segment, and send the modified DHCP responses to the special-purpose devices.

20 Claims, 12 Drawing Sheets

(56) References Cited

U.S. PATENT DOCUMENTS

| | | | |
|---|---|---|---|
| 2009/0217346 A1* | 8/2009 | Manring | H04L 63/102 726/1 |
| 2012/0030731 A1 | 2/2012 | Bhargava et al. | |
| 2013/0305341 A1* | 11/2013 | Baker | H04W 28/26 726/11 |
| 2015/0188949 A1 | 7/2015 | Mahaffey et al. | |
| 2016/0380900 A1* | 12/2016 | Kolhi | H04L 67/568 370/235 |
| 2017/0126797 A1 | 5/2017 | Frid | |
| 2017/0279770 A1 | 9/2017 | Woolward | |
| 2018/0234454 A1* | 8/2018 | Aggarwal | H04L 63/1458 |
| 2020/0067974 A1* | 2/2020 | Konda | H04L 63/20 |
| 2020/0177589 A1 | 6/2020 | Mangalvedkar et al. | |
| 2020/0304455 A1 | 9/2020 | Karkhanis | |
| 2021/0144159 A1 | 5/2021 | Sanghvi et al. | |
| 2021/0218594 A1* | 7/2021 | Sundararajan | H04L 63/0272 |
| 2021/0344769 A1* | 11/2021 | Breen | H04L 47/2441 |
| 2021/0385210 A1 | 12/2021 | Olden et al. | |
| 2022/0128985 A1* | 4/2022 | Szigeti | G05B 23/0262 |
| 2022/0292221 A1* | 9/2022 | Sohail | H04L 63/20 |
| 2023/0128098 A1 | 4/2023 | Agrawal et al. | |

OTHER PUBLICATIONS

U.S. Appl. No. 17/887,386, filed Aug. 12, 2022, Pending.
U.S. Appl. No. 17/887,396, filed Aug. 12, 2022, Pending.
U.S. Appl. No. 17/887,400, filed Aug. 12, 2022, Pending.
Cheng et al., "Cloud Security for Dummies, Netskope Special Edition," John Wiley & Sons, Inc., dated 2015, 53 pages.
"Netskope Introspection," netSkope, Inc., 2015, 3 pgs.
Netskope, "Data Loss Prevention and Monitoring in the Cloud", Nov. 2014, 18 pages.
"Cloud Data Loss Prevention Reference Architecture", Netskope, Sep. 2015, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope the 15 Critical CASB Use Cases", Netskope Inc., EB-141-1, dated 2015, 19 pages.
"Repave the Cloud-Data Breach Collision Course," netSkope, Inc., 2014, 6 pgs.
Netskope, "The 5 Steps to Cloud Confidence," netSkope Inc., 2014, 11 pgs.
"Netskope Cloud Confidence Index," netSkope, Inc., 2015, 4 pgs.
Netskope, Netskope Active Cloud DLP, dated 2015, 4 pages.
U.S. Appl. No. 17/887,376—Notice of Allowance dated Jul. 18, 2023, 5 pages.
U.S. Appl. No. 17/887,400—Notice of Allowance dated Jul. 10, 2023, 11 pages.
U.S. Appl. No. 17/887,376—Non-Final Office Action dated Nov. 8, 2022, 25 pages.
U.S. Appl. No. 17/887,376—Non-Final Office Action dated Mar. 9, 2023, 27 pages.
U.S. Appl. No. 17/887,386—Final Office Action dated Mar. 2, 2023, 26 pages.
U.S. Appl. No. 17/887,386—Non-Final Office Action dated Nov. 21, 2022, 40 pages.
U.S. Appl. No. 17/887,396—Notice of Allowance dated Apr. 11, 2023, 10 pages.
U.S. Appl. No. 17/887,396—Notice of Allowance dated Apr. 26, 2023, 11 pages.
U.S. Appl. No. 17/887,396—Non-Final Office Action dated Dec. 22, 2022, 59 pages.
U.S. Appl. No. 17/887,400—Non-Final Office Action dated Mar. 6, 2023, 55 pages.

* cited by examiner

Manipulating dynamic host configuration protocol (DHCP) responses in a network segment of a network to cause a plurality of special-purpose DHCP clients on the network segment to steer outbound network traffic to an inline secure forwarder on the network segment instead of a default gateway on the network segment 1002

Figure 10

DHCP SERVER-BASED STEERING LOGIC FOR POLICY ENFORCEMENT ON IOT DEVICES

PRIORITY DATA

This application claims priority to and the benefit of U.S. Provisional Patent Application No. 63/349,494, titled "AGENTLESS CLOUD INLINE IoT SECURITY SOLUTION," filed Jun. 6, 2022.

FIELD OF THE TECHNOLOGY DISCLOSED

The technology disclosed relates to enforcing security policies on special-purpose devices like Internet of Things (IoT) devices, and in particular relates to providing an agentless cloud inline IoT security solution.

RELATED APPLICATIONS

This application is related to U.S. patent application Ser. No. 17/887,376 titled "STEERING LOGIC FOR POLICY ENFORCEMENT ON IoT DEVICES," filed Aug. 12, 2022. The related application is hereby incorporated by reference for all purposes.

This application is related to U.S. patent application Ser. No. 17/887,386, titled "DHCP RELAY-BASED STEERING LOGIC FOR POLICY ENFORCEMENT ON IoT DEVICES," filed Aug. 12, 2022. The related application is hereby incorporated by reference for all purposes.

This application is related to U.S. patent application Ser. No. 17/887,396, titled "TRANSPARENT INLINE SECURE FORWARDER FOR POLICY ENFORCEMENT ON IoT DEVICES," filed Aug. 12, 2022. The related application is hereby incorporated by reference for all purposes.

This application is related to U.S. patent application Ser. No. 17/887,400, titled "CONFIGURING IoT DEVICES FOR POLICY ENFORCEMENT," filed Aug. 12, 2022. The related application is hereby incorporated by reference for all purposes.

INCORPORATIONS

The following are incorporated by reference for all purposes as if fully set forth herein:

U.S. patent application Ser. No. 14/198,499, filed Mar. 5, 2014, titled "SECURITY FOR NETWORK DELIVERED SERVICES;"

U.S. patent application Ser. No. 14/198,508, filed Mar. 5, 2014, titled "SECURITY FOR NETWORK DELIVERED SERVICES;"

U.S. patent application Ser. No. 14/835,640, filed Aug. 25, 2015, titled "SYSTEMS AND METHODS OF MONITORING AND CONTROLLING ENTERPRISE INFORMATION STORED ON A CLOUD COMPUTING SERVICE (CCS);"

U.S. patent application Ser. No. 14/835,632, filed Aug. 25, 2015, titled "SYSTEMS AND METHODS OF PER-DOCUMENT ENCRYPTION OF ENTERPRISE INFORMATION STORED ON A CLOUD COMPUTING SERVICE (CCS);"

U.S. patent application Ser. No. 15/368,240, filed Dec. 2, 2016, titled "SYSTEMS AND METHODS OF ENFORCING MULTI-PART POLICIES ON DATA-DEFICIENT TRANSACTIONS OF CLOUD COMPUTING SERVICES;"

U.S. patent application Ser. No. 15/368,246, filed Dec. 2, 2016, titled "MIDDLE WARE SECURITY LAYER FOR CLOUD COMPUTING SERVICES;"

U.S. patent application Ser. No. 15/256,483, filed Sep. 2, 2016, titled "MACHINE LEARNING BASED ANOMALY DETECTION;"

U.S. patent application Ser. No. 15/628,547, filed Jun. 20, 2017, titled "SYSTEMS AND METHODS OF DETECTING AND RESPONDING TO A DATA ATTACK ON A FILE SYSTEM;"

U.S. patent application Ser. No. 15/628,551, filed Jun. 20, 2017, titled "SYSTEMS AND METHODS OF DETECTING AND RESPONDING TO MALWARE ON A FILE SYSTEM;"

U.S. patent application Ser. No. 15/795,957, filed Oct. 27, 2017, titled "NON-INTRUSIVE SECURITY ENFORCEMENT FOR FEDERATED SINGLE SIGN-ON (SSO);"

U.S. patent application Ser. No. 15/958,672, filed Apr. 20, 2018, titled "REDUCING LATENCY IN SECURITY ENFORCEMENT BY A NETWORK SECURITY SYSTEM (NSS);"

U.S. patent application Ser. No. 15/958,637, filed Apr. 20, 2018, titled "REDUCING ERROR IN SECURITY ENFORCEMENT BY A NETWORK SECURITY SYSTEM (NSS);"

U.S. patent application Ser. No. 16/044,326, filed Jul. 24, 2018, titled "COMPACT LOGGING OF NETWORK TRAFFIC EVENTS;"

U.S. patent application Ser. No. 16/016,430, filed Jun. 22, 2018, titled "AGGREGATE NETWORK TRAFFIC MONITORING;"

U.S. patent application Ser. No. 15/986,732, filed May 22, 2018, titled "DATA LOSS PREVENTION USING CATEGORY-DIRECTED PARSERS;"

U.S. patent application Ser. No. 15/911,034, filed Mar. 2, 2018, titled "SIMULATION AND VISUALIZATION OF MALWARE SPREAD IN A CLOUD-BASED COLLABORATION ENVIRONMENT;"

U.S. patent application Ser. No. 16/556,168, filed Aug. 29, 2019, titled "METHODS AND SYSTEMS FOR SECURING AND RETRIEVING SENSITIVE DATA USING INDEXABLE DATABASES;"

U.S. patent application Ser. No. 16/118,278, filed Aug. 30, 2018, titled "ENRICHING DOCUMENT METADATA WITH CONTEXTUAL INFORMATION;"

U.S. patent application Ser. No. 16/408,215, filed May 9, 2019, titled "SMALL-FOOTPRINT ENDPOINT DATA LOSS PREVENTION (DLP);"

U.S. patent application Ser. No. 16/257,027, filed Jan. 24, 2019, titled "INCIDENT-DRIVEN INTROSPECTION FOR DATA LOSS PREVENTION;"

U.S. patent application Ser. No. 16/226,394, filed Dec. 19, 2018, titled "MULTI-LABEL CLASSIFICATION OF TEXT DOCUMENTS;"

U.S. patent application Ser. No. 16/361,023, filed Mar. 21, 2019, titled "SYSTEMS AND METHODS FOR ALERT PRIORITIZATION USING SECURITY EVENTS GRAPH;"

U.S. patent application Ser. No. 16/361,039, filed Mar. 21, 2019, titled "SYSTEM AND METHODS TO SHOW DETAILED STRUCTURE IN A SECURITY EVENTS GRAPH;"

U.S. patent application Ser. No. 16/807,128, filed Mar. 2, 2020, titled "LOAD BALANCING IN A DYNAMIC SCALABLE SERVICES MESH;"

U.S. patent application Ser. No. 16/807,132, filed Mar. 2, 2020, titled "RECOVERY FROM FAILURE IN A DYNAMIC SCALABLE SERVICES MESH;"

U.S. patent application Ser. No. 17/157,947, filed Jan. 25, 2021, titled "METADATA-BASED DETECTION AND PREVENTION OF PHISHING ATTACKS;"

U.S. patent application Ser. No. 16/411,039, filed May 13, 2019, titled "METADATA-BASED DATA LOSS PREVENTION (DLP) FOR CLOUD RESOURCES;"

U.S. patent application Ser. No. 16/556,183, filed Aug. 29, 2019, titled "EFFICIENT SCANNING FOR THREAT DETECTION USING IN-DOC MARKERS;"

U.S. patent application Ser. No. 16/891,647, filed Jun. 3, 2020, titled "DETECTING IMAGE-BORNE IDENTIFICATION DOCUMENTS FOR PROTECTING SENSITIVE INFORMATION;"

U.S. patent application Ser. No. 16/891,678, filed Jun. 3, 2020, titled "DETECTING SCREENSHOT IMAGES FOR PROTECTING AGAINST LOSS OF SENSITIVE SCREENSHOT-BORNE DATA;"

U.S. patent application Ser. No. 16/891,698, filed Jun. 3, 2020, titled "DETECTING ORGANIZATION IMAGE-BORNE SENSITIVE DOCUMENTS AND PROTECTING AGAINST LOSS OF THE SENSITIVE DOCUMENTS;"

U.S. patent application Ser. No. 17/163,408, filed Jan. 30, 2021, titled "UNIFIED POLICY ENFORCEMENT MANAGEMENT IN THE CLOUD;"

U.S. patent application Ser. No. 17/163,285, filed Jan. 29, 2021, titled "DYNAMIC POWER USER IDENTIFICATION AND ISOLATION FOR MANAGING SLA GUARANTEES;"

U.S. patent application Ser. No. 17/154,978, filed Jan. 21, 2021, titled "PREVENTING PHISHING ATTACKS VIA DOCUMENT SHARING;"

U.S. patent application Ser. No. 17/184,478, filed Feb. 24, 2021, titled "SIGNATURELESS DETECTION OF MALICIOUS MS OFFICE DOCUMENTS CONTAINING ADVANCED THREATS IN MACROS;"

U.S. patent application Ser. No. 17/184,502, filed Feb. 24, 2021, titled "SIGNATURELESS DETECTION OF MALICIOUS MS OFFICE DOCUMENTS CONTAINING EMBEDDED OLE OBJECTS;"

U.S. patent application Ser. No. 17/163,411, filed Jan. 30, 2021, titled "DYNAMIC DISTRIBUTION OF UNIFIED SECURITY POLICIES IN A CLOUD-BASED SECURITY SYSTEM;"

U.S. patent application Ser. No. 17/163,415, filed Jan. 30, 2021, titled "DYNAMIC ROUTING OF ACCESS REQUEST STREAMS IN A UNIFIED POLICY ENFORCEMENT SYSTEM;"

U.S. patent application Ser. No. 17/163,416, filed Jan. 30, 2021, titled "UNIFIED SYSTEM FOR DETECTING POLICY ENFORCEMENT ISSUES IN A CLOUD-BASED ENVIRONMENT;"

U.S. patent application Ser. No. 17/237,964, filed Apr. 22, 2021, titled "SYNTHETIC REQUEST INJECTION TO GENERATE METADATA FOR CLOUD POLICY ENFORCEMENT;"

U.S. patent application Ser. No. 17/238,545, filed Apr. 23, 2021, titled "SYNTHETIC REQUEST INJECTION TO GENERATE METADATA AT POINTS OF PRESENCE FOR CLOUD SECURITY ENFORCEMENT;"

U.S. patent application Ser. No. 17/238,563, filed Apr. 23, 2021, titled "DATA FLOW LOGIC FOR SYNTHETIC REQUEST INJECTION FOR CLOUD SECURITY ENFORCEMENT;"

U.S. patent application Ser. No. 17/238,579, filed Apr. 23, 2021, titled "SYNTHETIC REQUEST INJECTION TO RETRIEVE OBJECT METADATA FOR CLOUD POLICY ENFORCEMENT;"

U.S. patent application Ser. No. 17/237,877, filed Apr. 22, 2021, titled "SYNTHETIC REQUEST INJECTION TO RETRIEVE EXPIRED METADATA FOR CLOUD POLICY ENFORCEMENT;"

U.S. patent application Ser. No. 17/237,863, filed Apr. 22, 2021, titled "SYNTHETIC REQUEST INJECTION TO IMPROVE OBJECT SECURITY POSTURE FOR CLOUD SECURITY ENFORCEMENT;"

U.S. patent application Ser. No. 17/237,783, filed Apr. 22, 2021, titled "SYNTHETIC REQUEST INJECTION TO DISAMBIGUATE BYPASSED LOGIN EVENTS FOR CLOUD POLICY ENFORCEMENT;" and U.S. patent application Ser. No. 17/237,748, filed Apr. 22, 2021, titled "SYNTHETIC REQUEST INJECTION FOR CLOUD POLICY ENFORCEMENT."

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The "Internet of Things (IoT)" refers to the interconnection of uniquely-identifiable connected devices within the Internet infrastructure. Ultimately, IoT is expected to result in new, wide-ranging types of applications in which virtually any type of physical thing can provide information about itself or its surroundings and/or can be controlled remotely via client devices over the Internet.

Industrial and critical infrastructure operators are moving quickly to capture the benefits of process automation—by deploying billions of IoT devices. To protect the organization's physical and business-critical processes, a concise IoT security strategy is also necessary.

IoT devices simply expand the attack surface and increase the risk of becoming a victim. From thermostats, refrigeration, and HVAC systems to a wide range of sensors, cameras, and process controllers, IoT security challenges lie everywhere. IoT endpoints and systems have become trendy targets for attackers who want to compromise industrial control processes and maximize the economic benefits of a cyberattack. The impact on large industrial environments can be particularly devastating.

The widespread use of IoT devices creates unique IoT security challenges for traditional operational technology (OT), IT, and cloud networks. The built-in IoT device security is minimal. The IoT devices tend to have lightweight, stripped-down operating systems that lack the common security features of more robust assets.

Once deployed, most IoT Devices are rarely updated. This is particularly true of firmware, where many of the vulnerabilities lie. IoT devices can remain vulnerable to attacks that can easily be managed for other types of devices.

Connected IoT environments serve as entry points. IoT environments are frequently connected to business applications, data centers, IT infrastructure, and the cloud, which makes IoT devices easy targets for hackers to use for entry to the rest of the network.

Large scale IoT deployments are harder to segment. Large-scale IoT deployments do not easily lend themselves to the level of network segmentation needed to mitigate cyber threats or prevent the spread of malware.

Therefore, an opportunity arises to provide improved security for IoT devices.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 10 shows a flow chart of manipulating DHCP responses to cause the special-purpose devices to steer the outbound network traffic to the disclosed inline secure forwarder instead of the default gateway.

DETAILED DESCRIPTION

Figure 1:
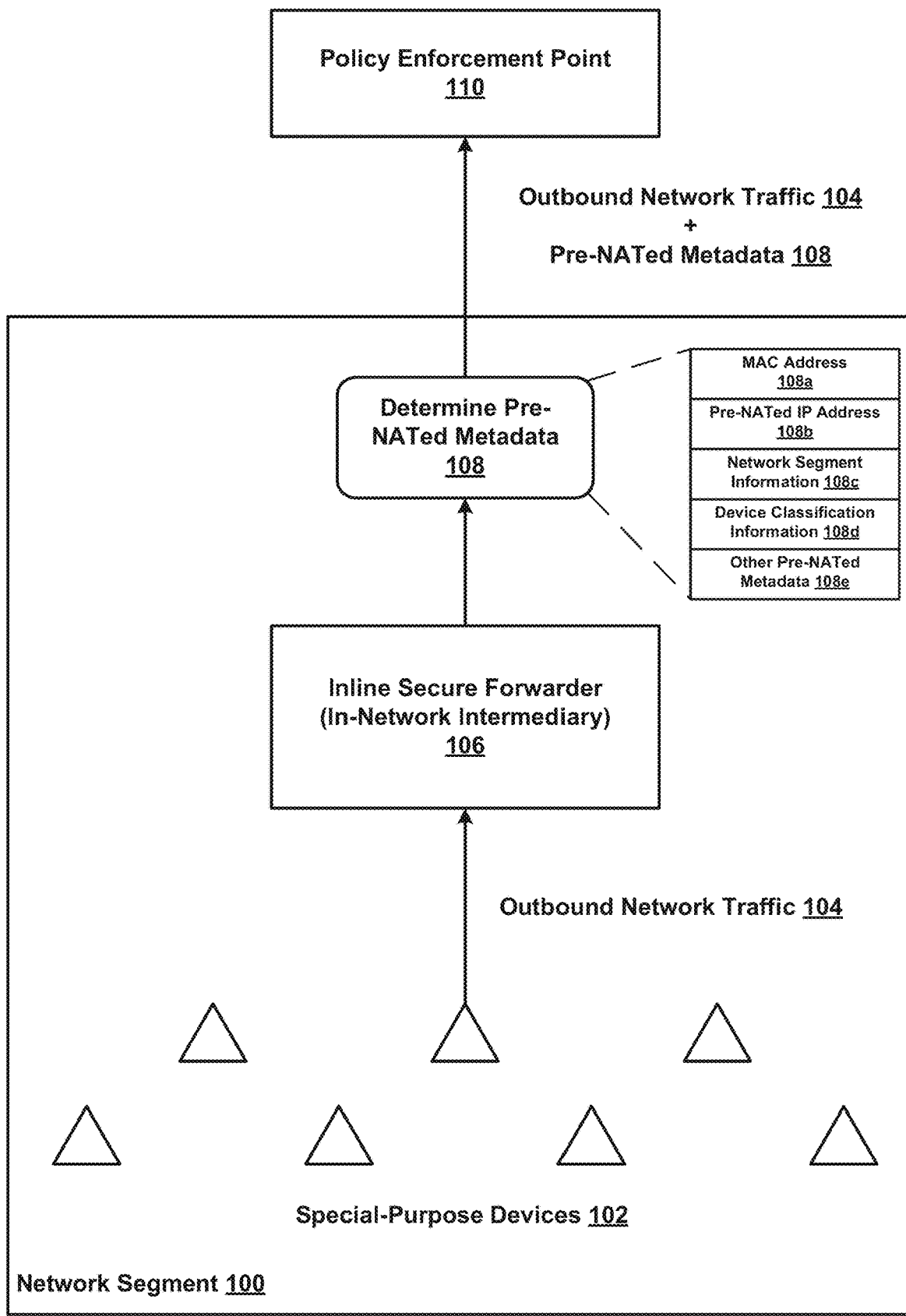
FIG. 1 illustrates one implementation of the disclosed inline secure forwarder intercepting outbound network traffic of special-purpose devices in a network segment of a network, generating pre-network address translated (pre-NATed) metadata from the intercepted outbound network traffic, and rerouting the intercepted outbound network traffic to a policy enforcement point for policy enforcement.

The following discussion is presented to enable any person skilled in the art to make and use the technology disclosed and is provided in the context of a particular application and its requirements. Various modifications to the disclosed implementations will be readily apparent to those skilled in the art, and the general principles defined herein can be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) can be implemented in a single piece of hardware (e.g., a general purpose signal processor or a block of random access memory, hard disk, or the like) or multiple pieces of hardware. Similarly, the programs can be stand-alone programs, can be incorporated as subroutines in an operating system, can be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Implementations can also be implemented in cloud computing environments. In this description and the following claims, "cloud computing" can be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Introduction

We solve the technical problem of harvesting pre-network address translated (pre-NATed) metadata of special-purpose devices (e.g., IoT devices) in a network segment (subnet) of a network by configuring an inline secure forwarder in the network segment at a "pre-NAT harvesting juncture" in the subnet, and further configuring the special-purpose devices to route outbound network traffic (e.g., North-South traffic) to the disclosed policies as opposed to a default gateway of the subnet. Examples of the pre-NATed metadata include media access control (MAC) addresses and private Internet Protocol (IP) addresses of the special-purpose devices.

The concept of NAT is that a device on the subnet sends a packet to the NAT-enabled default gateway (e.g., a router) when the device tries to connect to the Internet. The NAT-enabled default gateway removes the device-specific/private source IP address from the packet, places its public addresses in the source IP field of the packet, and sends the packet out on the Internet.

After the NAT-enabled default gateway strips the device's private address from the source IP address field and instead places its own public address, the NAT-enabled default gateway populates a translation table with the private-to-public address mappings. When a destination server sends a reply to a target device on the subnet, the NAT-enabled default gateway translates the subnet-wide public IP address back to a private IP address of the target device and sends the reply to the target device.

Therefore, the NAT essentially hides (or masks) the internal structure of the network and, in particular, conceals (or masks) the unique identities of the devices on the network. This becomes a challenge with IoT security that aspires to apply IoT-specific policies on IoT devices by, for example, distinguishing between IoT and non-IoT devices on the same subnet—which share the same NATed public IP address but have different pre-NATed private IP addresses.

The disclosed inline secure forwarder intercepts the outbound network traffic before the outbound network traffic reaches the default proxy for NAT. Then, the disclosed inline secure forwarder determines the pre-NATed (or unmasked) metadata and reroutes the outbound network traffic and the pre-NATed metadata to a policy enforcement point for policy enforcement.

We also disclose different implementations of configuring the IoT devices to send the outbound network traffic to the inline secure forwarder as opposed to the default gateway. Some examples include static manual configuration, static automated configuration, dynamic host configuration protocol (DHCP) relay-based steering, DHCP server-based steering, and the inline secure forwarder operating in a transparent mode. More details follow.

Inline Secure Forwarder

FIG. 1 illustrates one implementation of the disclosed inline secure forwarder 106 intercepting outbound network traffic 104 of special-purpose devices 102 in a network segment 102 of a network, generating pre-network address translated (pre-NATed) metadata 108 from the intercepted outbound network traffic 104, and rerouting the intercepted outbound network traffic 104 to a policy enforcement point 110 for policy enforcement.

The disclosed inline secure forwarder 106, also referred to herein as a proxy, an in-network intermediary, and an in-network gateway, is located in the network segment 100. The disclosed inline secure forwarder 106 can be provided by an IoT security provider like the assignee Netskope, Inc. The disclosed inline secure forwarder 106 can be implemented on-premises. In other implementations, the disclosed inline secure forwarder 106 can run on client-side as an endpoint agent.

The policy enforcement point 110, also referred to herein as a network security system, consolidates multiple types of security enforcements. Examples of the security enforcements include authentication, federated single sign-on (SSO), authorization, credential mapping, device profiling, encryption, tokenization, data leakage prevention (DLP), logging, alerting, and malware detection and prevention.

Example functionalities of the policy enforcement point 110 include cloud access security brokers (CASBs), secure web gateways (SWGs), network firewalls, application firewalls, routing systems, load balancing systems, filtering systems, data planes, management planes, data loss prevention (DLP) systems, intrusion prevention systems (IPSs), zero trust network access (ZTNA), and secure access service edge (SASE). The policy enforcement point 110 can also be a network security stack that includes different security systems like the CASBs, the SWGs, the network firewalls, the application firewalls, the routing systems, the load balancing systems, the filtering systems, the data planes, the management planes, the DLP systems, and the IP systems. The policy enforcement point 110 can be implemented on-premises or can be cloud-based. Also, multiple geographically distributed points of presence of the policy enforcement point 110 can be implemented in a secure access service edge (SASE) network.

The policy enforcement point 110 deeply inspects the outbound network traffic 104 and the pre-NATed metadata 108. The policy enforcement point 110 uses a combination of deep application programming interface inspection (DAPII), deep packet inspection (DPI), and log inspection for threat detection and data loss prevention (DLP). In some implementations, the policy enforcement point 110 can run on server-side as a cloud resource. In other implementations, the policy enforcement point 110 can run on client-side as an endpoint agent.

For additional information about the policy enforcement point 110, reference can be made to, for example, commonly owned U.S. patent application Ser. Nos. 14/198,499; 14/198,508; 14/835,640; 14/835,632; and 62/307,305; Cheng, Ithal, Narayanaswamy, and Malmskog. Cloud Security For Dummies, Netskope Special Edition. John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

The special-purpose devices 102 can be Internet of Things (IoT) devices or Enterprise Internet of Things (EIoT), operational technology (OT) devices, industrial Internet of Things (IIoT) devices, industrial control system (ICS) devices, and Internet of Medical Things (IoMT) devices. Examples of the special-purpose devices 102 include smart thermostats, cameras, TVs, lighting, appliances, robots, toys, medical devices, and farming devices, and, in particular, temperature sensors, humidity sensors, pressure sensors, proximity sensors, level sensors, accelerometers, gyroscope, gas sensors, infrared sensors, and optical sensors.

Different from the special-purpose devices 102 are general-purpose devices. Examples of the general-purpose devices include personal computers with Windows operating system, Macintosh operating system, and Linux operating system.

The pre-NATed metadata 108 can include physical layer, layer 1, and layer 2 information. Examples include media access control (MAC) 108a, private IP addresses 108b, network segment information 108c (e.g., subnet name), international mobile subscriber identity (IMSI), electronic serial number (ESN), signal strength information, information elements and other layer 1 and 2 details that are specific to an associated communication protocol.

The pre-NATed metadata 108 about a particular special-purpose device uniquely identifies the particular special-purpose device.

The pre-NATed metadata 108 can also include device categorization information 108*d* that identifies a category to which a special-purpose device belongs. Example categories include an Enterprise Internet of Things (EIoT) device category, an operational technology (OT) device category, an Internet of Medical Things (IoMT) device category, and/or other IoT device category.

The pre-NATed metadata 108 can also include other information 108*e* as well. Examples include manufacturing information about the special-purpose devices 102. The manufacturing information identifies manufacturers of the special-purpose devices 102. Further examples include software information about the special-purpose devices 102. The software information identifies applications and/or application versions running on the special-purpose devices 102. Yet further examples include functional information about the special-purpose devices 102. The functional information identifies functions of the special-purpose devices 102. The functions include, for example, medical functions, premise security functions, scanning functions, and/or sensing functions.

Other examples of the pre-NATed metadata 108 include:
Operating system of the special-purpose device, a type of the special-purpose device, and a classification of the special-purpose device. Ex: type: Apple tablet, classification: low power computing, OS: iOS 10.
Functionality of the special-purpose device, and services and applications running on the special-purpose device. Ex: Function: Audio/video conferencing, Apps: Zoom, Teams.
Micro-location of the special-purpose device. This gives insight into the mobility of the special-purpose device on a campus, its current location, most frequently-used paths of movement, and whether the special-purpose device travels outside the campus.
Ownership and control of the special-purpose device. Whether the special-purpose device is owned by the corporate, employee, visitor, or transient. Whether the special-purpose device is controlled by a user, or the special-purpose device is automated (e.g., a smartphone versus a smart TV).
Behavior and rules-based analysis of all data transmissions across all protocols and spectra to and from the special-purpose device.

The pre-NATed metadata 108 can also include other information 108*e* as well. Examples include manufacturing information about the special-purpose devices 102. The manufacturing information identifies manufacturers of the special-purpose devices 102. Further examples include software information about the special-purpose devices 102. The software information identifies applications and/or application versions running on the special-purpose devices 102. Yet further examples include functional information about the special-purpose devices 102. The functional information identifies functions of the special-purpose devices 102. The functions include, for example, medical functions, premise security functions, scanning functions, and/or sensing functions.

The in-network intermediary 106 is configured to receive the outbound network 104 traffic from the special-purpose devices 102 on the network segment 100 of the network. The outbound network traffic 104 is directed at one or more out-of-network servers. Examples of the out-of-network servers include cloud applications, web applications, and websites. The in-network intermediary 106 is further configured to determine, from the outbound network traffic 104, metadata 108 required for policy enforcement prior to the metadata 108 being masked by network address translation (NAT). The in-network intermediary 106 is further configured to append the metadata 108 to the outbound network traffic 108, and send the outbound network traffic 104 appended with the metadata 108 to the policy enforcement point 110 for policy enforcement. In one implementation, the in-network intermediary 106 is further configured to append the metadata 108 to the outbound network traffic 104 on a packet level.

In some implementations, the inline secure forwarder 106 can receive the metadata 108 from an external entity in the network segment 100. The inline secure forwarder 106 can then pass the received metadata 108 to the policy enforcement point 110. An example of the external entity is a device classification service (e.g., WootCloud™) that generates, as the metadata 108, the device classification information 108*d* like which of the following categories a special-purpose device belongs to an Enterprise Internet of Things (EIoT) device category, an operational technology (OT) device category, an Internet of Medical Things (IoMT) device category, and/or other IoT device category. In other implementations, the device classification service can send the metadata 108 directly to the policy enforcement point 110.

In yet other implementations, the device classification service can send the metadata 108 directly to a management plane (or a policy control point), such that the management plane is configured to disseminate the metadata 108 to multiple instances of the policy enforcement point 110 that are distributed as different points-of-presence (PoPs).

In some implementations, the MAC address 108*a*, the pre-NATed IP address 108*b*, and/or the network segment information 108*c* can be used to uniquely identify a particular special-purpose device and associate the corresponding device classification information 108*d* and/or the other pre-NATed metadata 108*e* with the uniquely identified particular special-purpose device.

Figure 2:
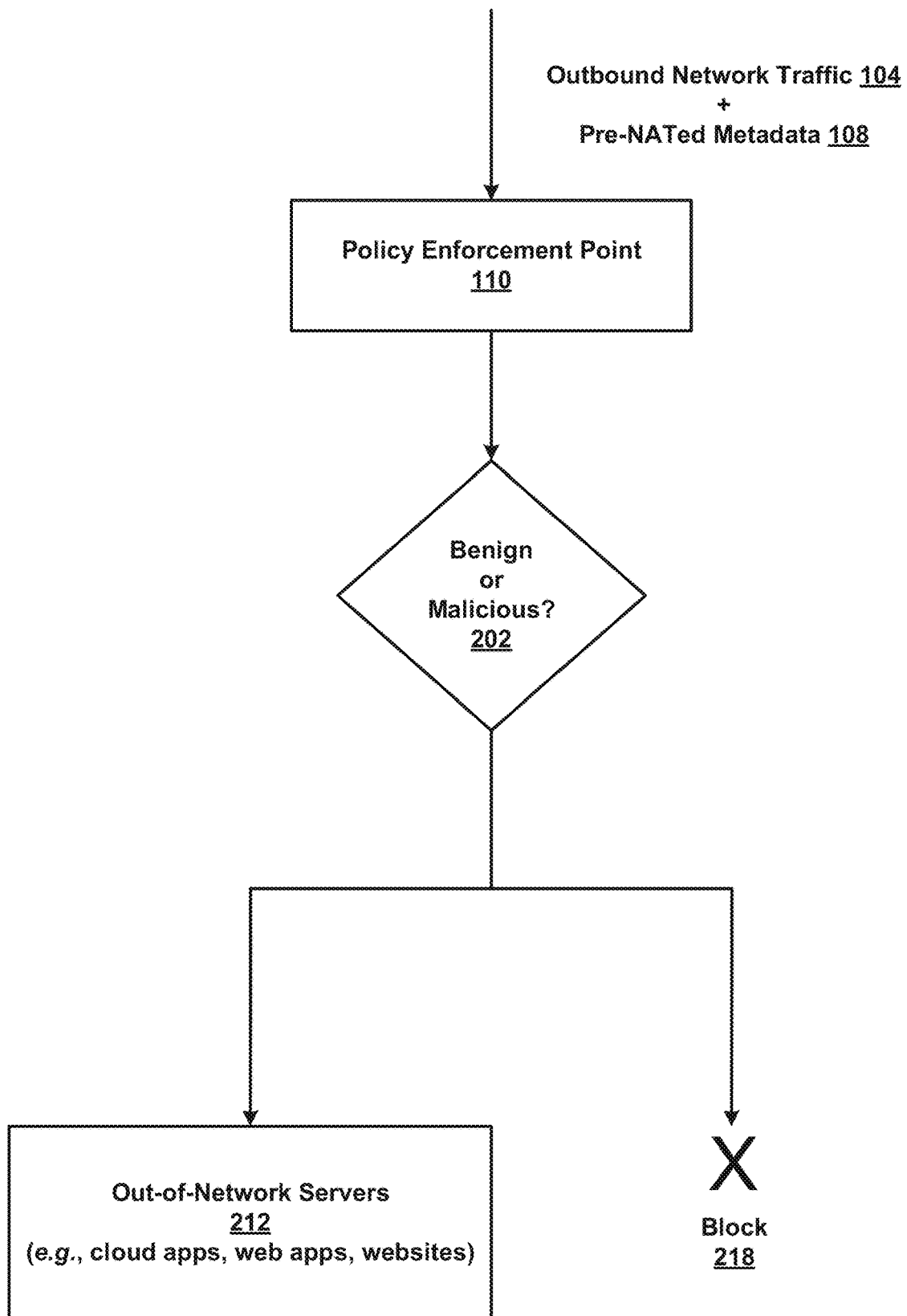
FIG. 2 shows one implementation of policy enforcement on the intercepted outbound network traffic using the pre-NATed metadata.

FIG. 2 shows one implementation of policy enforcement on the intercepted outbound network traffic 104 using the pre-NATed metadata 108. The policy enforcement point 110 is configured to forward 212 the outbound network traffic 104 to the out-of-network servers in response to classifying 202 the outbound network traffic 104 as benign and/or policy-conforming. The policy enforcement point 110 is further configured to block 218 the outbound network traffic 104 in response to classifying 202 the outbound network traffic 104 as malicious and/or policy-non-conforming.

Figure 3:
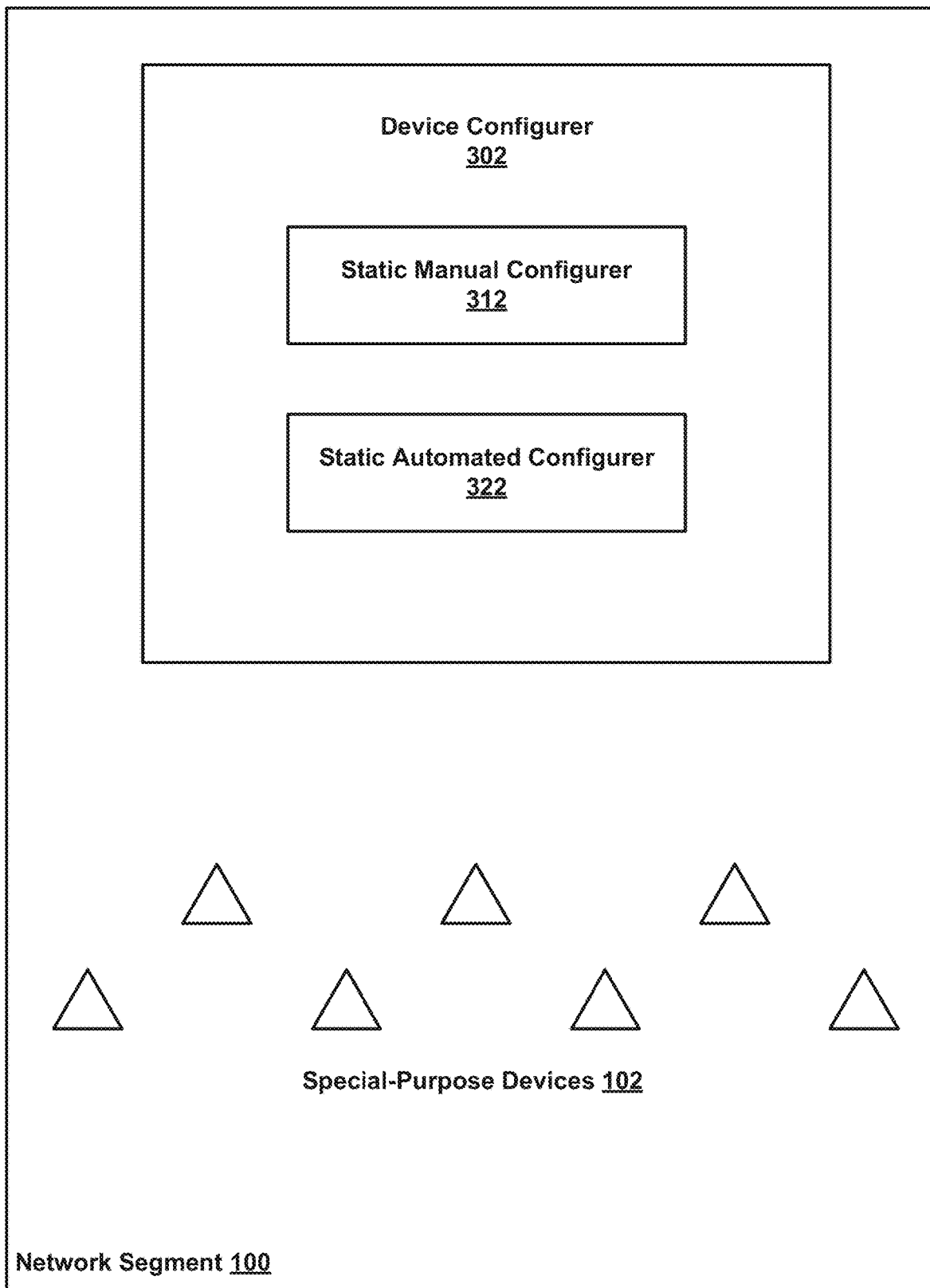
FIG. 3 depicts one implementation of configuring the special-purpose devices to route the outbound network traffic to the disclosed inline secure forwarder instead of a default gateway.

FIG. 3 depicts one implementation of configuring the special-purpose devices 102 to route the outbound network traffic 104 to the disclosed inline secure forwarder 106 instead of a default gateway (e.g., a router in the network segment 100). In one implementation, the special-purpose devices 102 are configured by a device configurer 302.

In one implementation, the special-purpose devices 102 are configured to steer the outbound network traffic 104 to the in-network intermediary 106 based on static manual configuration of the special-purpose devices 102. The static manual configuration includes manually configuring the special-purpose devices 102 to have the in-network intermediary 106 as the default gateway and therefore receive the outbound network traffic 104 from the special-purpose devices 102. In some implementations, the static manual configuration is implemented by a static manual configurer 312.

In another implementation, the special-purpose devices 102 are configured to steer the outbound network traffic 104 to the in-network intermediary 106 based on static automated configuration of the special-purpose devices 102. The static automated configuration includes using a script to automatically configure the special-purpose devices 102 to have the in-network intermediary 106 as the default gateway and therefore receive the outbound network traffic 104 from the special-purpose devices 102. In some implementations, the static automated configuration is implemented by a static manual configurer 322.

Figure 4:
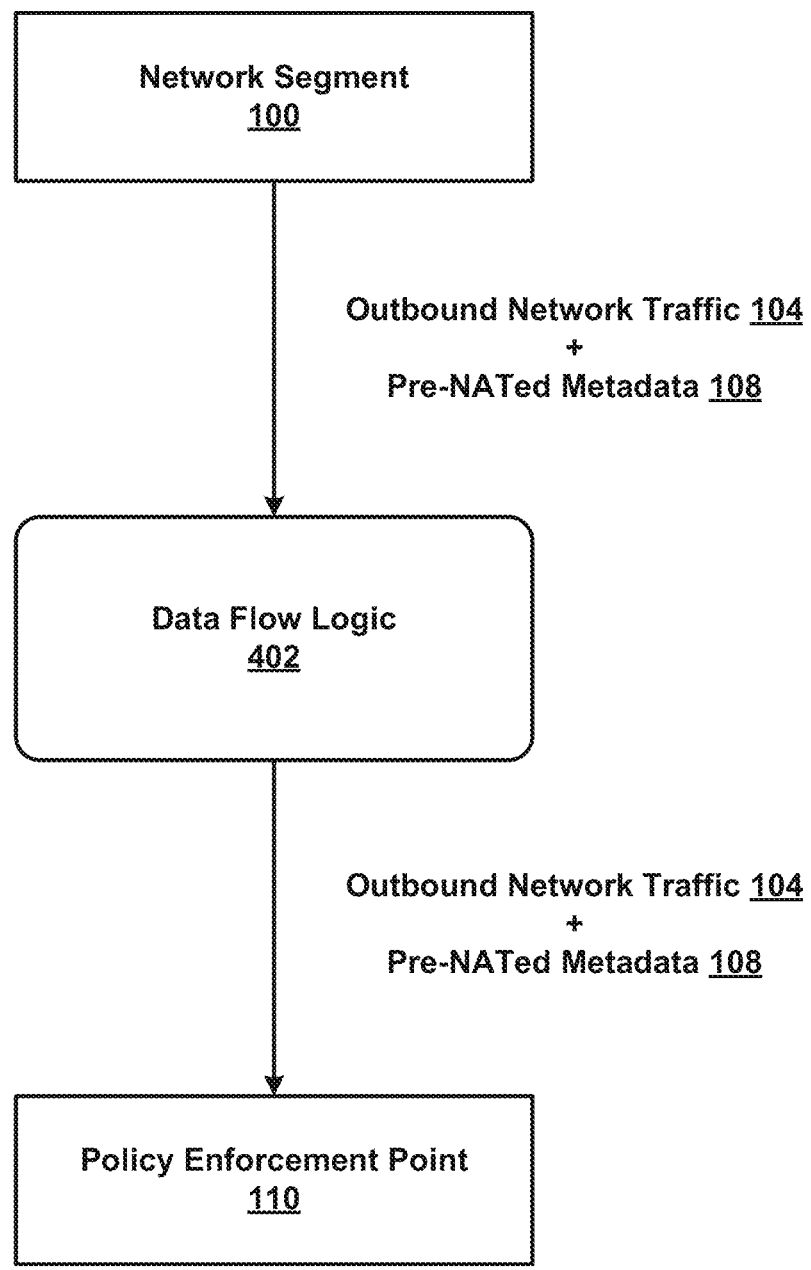
FIG. 4 is one implementation of the disclosed data flow logic that communicates the outbound network traffic and the pre-NATed metadata from the network segment to the policy enforcement point.

FIG. 4 is one implementation of the disclosed data flow logic 402 that communicates the outbound network traffic 104 and the pre-NATed metadata 108 from the network segment 100 to the policy enforcement point 110. The disclosed data flow logic 402 is configured to route, to the policy enforcement point 110, the outbound network traffic 104 from a device on the network segment 100 of the network. The disclosed data flow logic 402 is further configured to route, to the policy enforcement point 110, the pre-NATed metadata 108, which uniquely identifies the device. In one implementation, the device is a special-purpose device. In another implementation, the device is a general-purpose device.

The in-network gateway 106 is configured to intercept the pre-network address translated (pre-NATed) outbound network traffic 104 from the special-purpose devices 102 on the network segment 100 of the network. The in-network gateway 106 is further configured to determine, from the pre-NATed outbound network traffic 104, the pre-NATed metadata 108 about the special-purpose devices 102. The in-network gateway 106 is further configured to make the pre-NATed metadata 108 along with the pre-NATed outbound network traffic 104 available for policy enforcement.

DHCP Relay-Based Steering Logic

Figure 5:
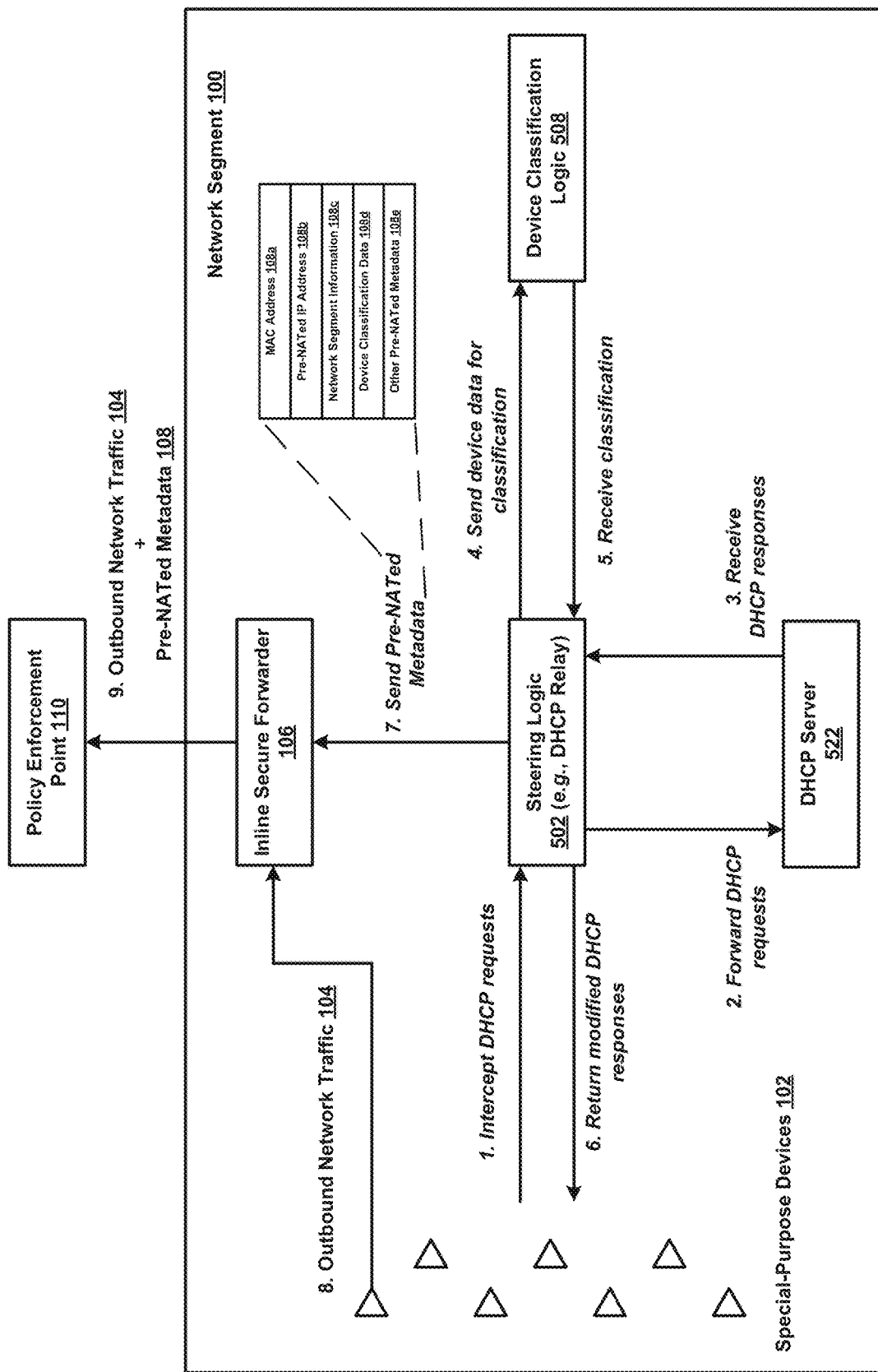
FIG. 5 illustrates one implementation of the disclosed steering logic operating in a dynamic host configuration protocol (DHCP) relay mode to steer the outbound network traffic and the pre-NATed metadata towards the disclosed inline secure forwarder.

FIG. 5 illustrates one implementation of the disclosed steering logic 502 operating in a dynamic host configuration protocol (DHCP) relay mode to steer the outbound network traffic 104 and the pre-NATed metadata 108 towards the disclosed inline secure forwarder 106. The disclosed steering logic 502 runs on a DHCP relay. The DHCP relay is on the network segment 100.

The disclosed steering logic 502 is interposed between the special-purpose devices 102 on the network segment 100 of the network and the DHCP server 522 on the network segment 100. The special-purpose devices 102 are Internet of Things (IoT) devices, operational technology (OT) devices, industrial Internet of Things (IIoT) devices, industrial control system (ICS) devices, and Internet of Medical Things (IoMT) devices.

At action 1, the disclosed steering logic 502 intercepts DHCP requests broadcasted to the DHCP server 522 by the special-purpose devices 102.

At action 2, the disclosed steering logic 502 forwards the intercepted DHCP requests to the DHCP sever 522. The intercepted DHCP requests include media access control (MAC) addresses of the special-purpose devices 102.

At action 3, the disclosed steering logic 502 receives, from the DHCP server 522, DHCP responses to the intercepted DHCP requests. The received DHCP responses assign, to the special-purpose devices 102, Internet Protocol (IP) addresses and a default gateway (e.g., a router) on the network segment 100.

At action 4, the disclosed steering logic 502 sends device data to a device classification logic 508 (e.g., WootCloud™). The device data includes the MAC addresses, the IP addresses, the information about the network segment 100, and/or application protocol metadata. The device classification logic 508 is configured to use the MAC addresses, the IP addresses, the information about the network segment 100, and/or application protocol metadata to categorize the special-purpose devices 102 to one of a plurality of special-purpose device categories. The plurality of special-purpose device categories includes an Enterprise Internet of Things (EIoT) device category, an operational technology (OT) device category, an Internet of Medical Things (IoMT) device category, and/or other IoT device category.

The device classification logic 508 is further configured to use the MAC addresses, the IP addresses, and/or the information about the network segment 100 to determine manufacturing information about the special-purpose devices 102. The manufacturing information identifies manufacturers of the special-purpose devices 102.

The device classification logic 508 is further configured to use the MAC addresses, the IP addresses, and/or the information about the network segment 100 to determine software information about the special-purpose devices 102. The software information identifies applications and/or application versions running on the special-purpose devices 102.

The device classification logic 508 is further configured to use the MAC addresses, the IP addresses, and/or the information about the network segment 100 to determine functional information about the special-purpose devices 102. The functional information identifies functions of the special-purpose devices 102. The functions include medical functions, premise security functions, scanning functions, and/or sensing functions.

The device classification logic 508 is further configured to communicate the categorization, the manufacturing information, the software information, and/or the functional information to the disclosed steering logic 502 as part of the positive determination. The disclosed steering logic 502 is further configured to communicate the categorization, the manufacturing information, the software information, and/or the functional information to the disclosed inline secure forwarder 106.

At action 5, based on the MAC addresses, the IP addresses, the information about the network segment 100, and/or application protocol metadata, the disclosed steering logic 502 receives, from the device classification logic 508, a positive determination that the special-purpose devices 102 are special-purpose devices and not general-purpose devices.

At action 6, based on the positive determination, the disclosed steering logic 502 modifies the received DHCP responses by replacing the default gateway with the disclosed inline secure forwarder 106 on the network segment 100, and sends (returns) the modified DHCP responses to the special-purpose devices 102. The modified DHCP responses configure the special-purpose devices 102 to steer the outbound network traffic 104 to the disclosed inline secure forwarder 106 instead of the default gateway (action 8). The disclosed inline secure forwarder 106 is configured to route the outbound network traffic 104 to the policy enforcement point 110.

In one implementation, the policy enforcement point 110 is a cloud service. In one implementation, the policy enforcement point 110 is an on-premise service. In one implementation, the policy enforcement point 110 is outside the network. In one implementation, the policy enforcement point 110 is inside the network.

The disclosed inline secure forwarder 106 is further configured to communicate the categorization, the manufacturing information, the software information, and/or the functional information to the policy enforcement point 110 in conjunction with the outbound network traffic 104.

The policy enforcement point 110 is configured to use the categorization, the manufacturing information, the software information, and/or the functional information to enforce one or more policies on the outbound network traffic 104.

The policy enforcement point 110 is further configured to classify the outbound network traffic 104 as benign and/or policy-conforming based on the enforcement of the policies. Based on the benign and/or policy-conforming classification, the policy enforcement point 110 is further configured to send the outbound network traffic 104 to one or more out-of-network destinations intended by the special-purpose devices 102. The out-of-network destinations include cloud applications. The out-of-network destinations include web applications and/or websites.

The policy enforcement point 110 is further configured to classify the outbound network traffic 104 as malicious and/or policy-non-conforming based on the enforcement of the policies. The policy enforcement point 110 is further configured to communicate the malicious and/or policy-non-conforming classification to the disclosed inline secure forwarder 106. The special-purpose devices 102 are quarantined and removed from the network segment 100 in response to the malicious and/or policy-non-conforming classification. The special-purpose devices 102 are subjected to a vulnerability scan in response to the malicious and/or policy-non-conforming classification. The vulnerability scan is performed by a third party application programming interface (API).

The disclosed steering logic 502 is further configured to receive, from the device classification logic 508, a negative determination that the special-purpose devices 102 are general-purpose devices and not special-purpose devices. The general-purpose devices include personal computers with Windows operating system, Macintosh operating system, and Linux operating system. The device classification logic 508 is further configured to communicate the negative determination to the disclosed steering logic 502.

At action 7, the disclosed steering logic 702 sends the pre-NATed metadata 108 to the disclosed inline secure forwarder 106.

The disclosed steering logic 502 is further configured to not modify the received DHCP responses based on the negative determination. Based on the negative determination, the outbound network traffic 104 is sent to the policy enforcement point 110 via the disclosed inline secure forwarder 106 to enforce one or more policies on the outbound network traffic 104.

In one implementation, the device classification logic 508 is located on a mirrored port. In some implementations, the mirrored port is outside the network. In other implementations, the mirrored port is inside the network.

In one implementation, the outbound network traffic 104 is North-South traffic. In one implementation, the disclosed inline secure forwarder 106 is further configured to route the outbound network traffic 104 to the policy enforcement point 110 over a secure tunnel. In one implementation, the secure tunnel is encrypted.

In one implementation, the IP addresses are pre-network address translation (NAT) IP addresses.

In one implementation, the default gateway uses the NAT to translate the IP addresses into a public IP address. In one implementation, the disclosed steering logic 502 is further configured to communicate with the device classification logic 508 over an API.

In some implementations, the disclosed inline secure forwarder 106 is a proxy. In other implementations, the disclosed inline secure forwarder 106 is a forward proxy.

In some implementations, the disclosed inline secure forwarder 106 is a software logic running on one or more network components on the network segment 100. In other implementations, the disclosed inline secure forwarder 106 is a dedicated network component on the network segment 100.

In one implementation, the information about the network segment 100 includes a name of the network segment 100.

In one implementation, the policy enforcement point 110 runs on the disclosed inline secure forwarder 106.

In one implementation, the disclosed inline secure forwarder 106 is further configured to append the MAC addresses, the IP addresses, and/or the information about the network segment 100 to the outbound network traffic 104 at a packet level.

In one implementation, the disclosed inline secure forwarder 106 is further configured to transmit, to the policy enforcement point 110, the packets of the outbound network traffic 104 appended with the MAC addresses, the IP addresses, and/or the information about the network segment 100.

In one implementation, the disclosed inline secure forwarder 106 is further configured to append the categorization, the manufacturing information, the software information, and/or the functional information to the outbound network traffic 104 at a packet level.

In one implementation, at action 9, the disclosed inline secure forwarder 106 is further configured to transmit, to the policy enforcement point 110, the packets of the outbound network traffic 104 appended with the categorization, the manufacturing information, the software information, and/or the functional information.

In one implementation, the device classification logic 508 is a rule-based logic. In another implementation, the device classification logic 508 is a machine learning-based logic.

Figure 6:
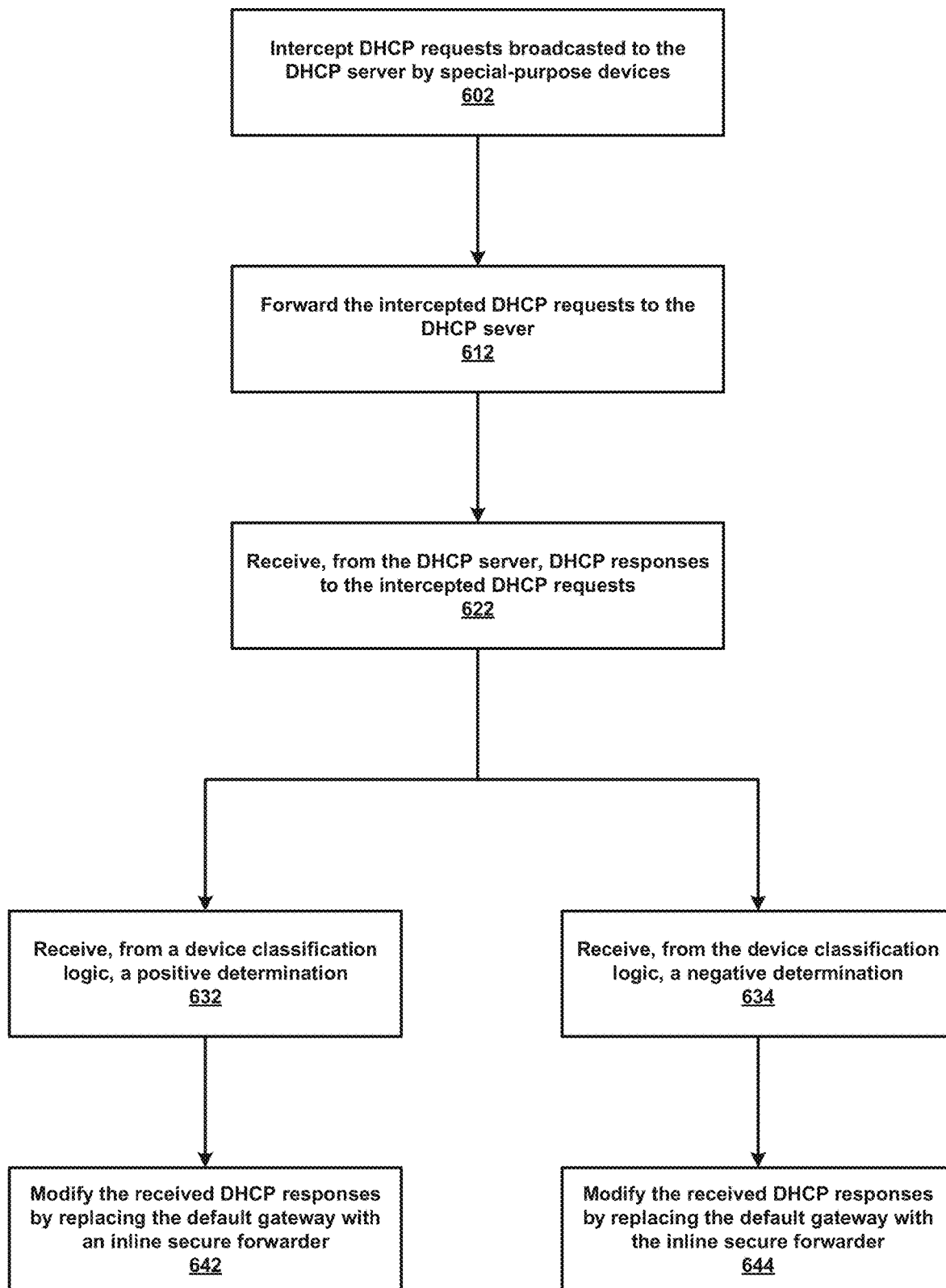
FIG. 6 is a flow chart that depicts how the disclosed steering logic interacts with a device classification logic to differentiate between special-purpose devices and general-purpose devices.

FIG. 6 is a flow chart that depicts how the disclosed steering logic 502 interacts with the device classification logic 508 to differentiate between special-purpose devices and general-purpose devices.

At action 602, the disclosed steering logic 502 intercepts DHCP requests broadcasted to the DHCP server 522 by the special-purpose devices 102.

At action 612, the disclosed steering logic 502 forwards the intercepted DHCP requests to the DHCP sever 522. The intercepted DHCP requests include media access control (MAC) addresses of the special-purpose devices 102.

At action 622, the disclosed steering logic 502 receives, from the DHCP server 522, DHCP responses to the intercepted DHCP requests. The received DHCP responses assign, to the special-purpose devices 102, Internet Protocol (IP) addresses and a default gateway on the network segment 100.

At action 632, based on the MAC addresses, the IP addresses, the information about the network segment 100, and/or application protocol metadata, the disclosed steering logic 502 receives, from the device classification logic 508, a positive determination that the special-purpose devices 102 are special-purpose devices and not general-purpose devices.

At action 642, based on the positive determination, the disclosed steering logic 502 modifies the received DHCP responses by replacing the default gateway with the disclosed inline secure forwarder 106 on the network segment 100, and sends (returns) the modified DHCP responses to the special-purpose devices 102. The modified DHCP responses configure the special-purpose devices 102 to steer the outbound network traffic 104 to the disclosed inline secure forwarder 106 instead of the default gateway. The disclosed inline secure forwarder 106 is configured to route the outbound network traffic 104 to the policy enforcement point 110.

At action 634, the disclosed steering logic 502 is further configured to receive, from the device classification logic 508, a negative determination that the special-purpose devices 102 are general-purpose devices and not special-purpose devices. The general-purpose devices include personal computers with Windows operating system, Macintosh operating system, and Linux operating system. The device classification logic 508 is further configured to communicate the negative determination to the disclosed steering logic 502.

At action 644, based on the negative determination, the disclosed steering logic 502 modifies the received DHCP responses by replacing the default gateway with the disclosed inline secure forwarder 106 on the network segment 100, and sends (returns) the modified DHCP responses to the general-purpose devices. The modified DHCP responses configure the general-purpose devices to steer the outbound network traffic 104 to the disclosed inline secure forwarder 106 instead of the default gateway. The disclosed inline secure forwarder 106 is configured to route the outbound network traffic 104 to the policy enforcement point 110.

DHCP Server-Based Steering Logic

Figure 7:
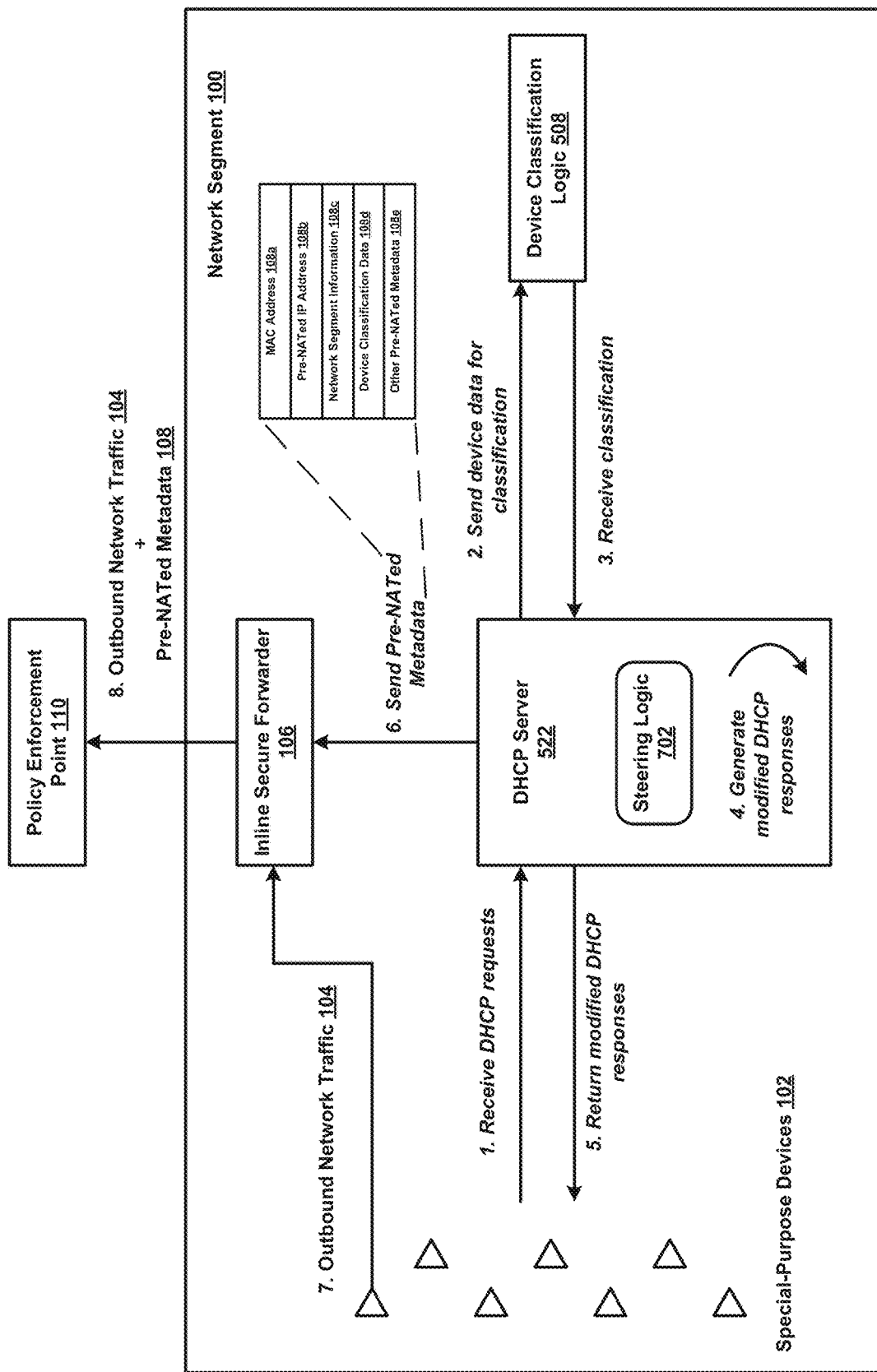
FIG. 7 depicts one implementation of the disclosed steering logic operating in a DHCP server mode to steer the outbound network traffic and the pre-NATed metadata towards the disclosed inline secure forwarder.

FIG. 7 depicts one implementation of the disclosed steering logic 702 operating in a DHCP server mode to steer the outbound network traffic 104 and the pre-NATed metadata 108 towards the disclosed inline secure forwarder 106.

The disclosed steering logic 702 runs on the DHCP server 522 on the network segment 100 of the network. At action 1, the disclosed steering logic 702 is configured to receive DHCP requests broadcasted to the DHCP server 522 by the special-purpose devices 102 on the network segment 100. The received DHCP requests include media access control (MAC) addresses of the special-purpose devices 102.

The disclosed steering logic 702 is configured to access DHCP responses generated by the DHCP server 522 for the DHCP requests. The accessed DHCP responses assign, to the special-purpose devices 102, Internet Protocol (IP) addresses and a default gateway (e.g., a router) on the network segment 100.

At action 2, the disclosed steering logic 702 sends device data to the device classification logic 508. The device data includes the MAC addresses, the IP addresses, the information about the network segment 100, and/or application protocol metadata. The device classification logic 508 is configured to use the MAC addresses, the IP addresses, the information about the network segment 100, and/or application protocol metadata to categorize the special-purpose devices 102 to one of the plurality of special-purpose device categories.

At action 3, based on the MAC addresses, the IP addresses, the information about the network segment 100, and/or application protocol metadata, the disclosed steering logic 702 receives, from the device classification logic 508, a positive determination that the special-purpose devices 102 are special-purpose devices and not general-purpose devices.

At action 4, based on the positive determination, the disclosed steering logic 702 modifies the accessed DHCP responses by replacing the default gateway with the disclosed inline secure forwarder 106 on the network segment 100, and thereby generates modified DHCP responses.

At action 5, the disclosed steering logic 702 sends (returns) the modified DHCP responses to the special-purpose devices 102. The modified DHCP responses configure the special-purpose devices 102 to steer the outbound network traffic 104 to the disclosed inline secure forwarder 106 instead of the default gateway (action 7). The disclosed inline secure forwarder 106 is configured to route the outbound network traffic 104 to the policy enforcement point 110.

At action 6, the disclosed steering logic 702 sends the pre-NATed metadata 108 to the disclosed inline secure forwarder 106.

In one implementation, at action 8, the disclosed inline secure forwarder 106 is further configured to transmit, to the policy enforcement point 110, the packets of the outbound network traffic 104 appended with the categorization, the manufacturing information, the software information, and/or the functional information.

Transparent Mode Steering Logic

Figure 8:
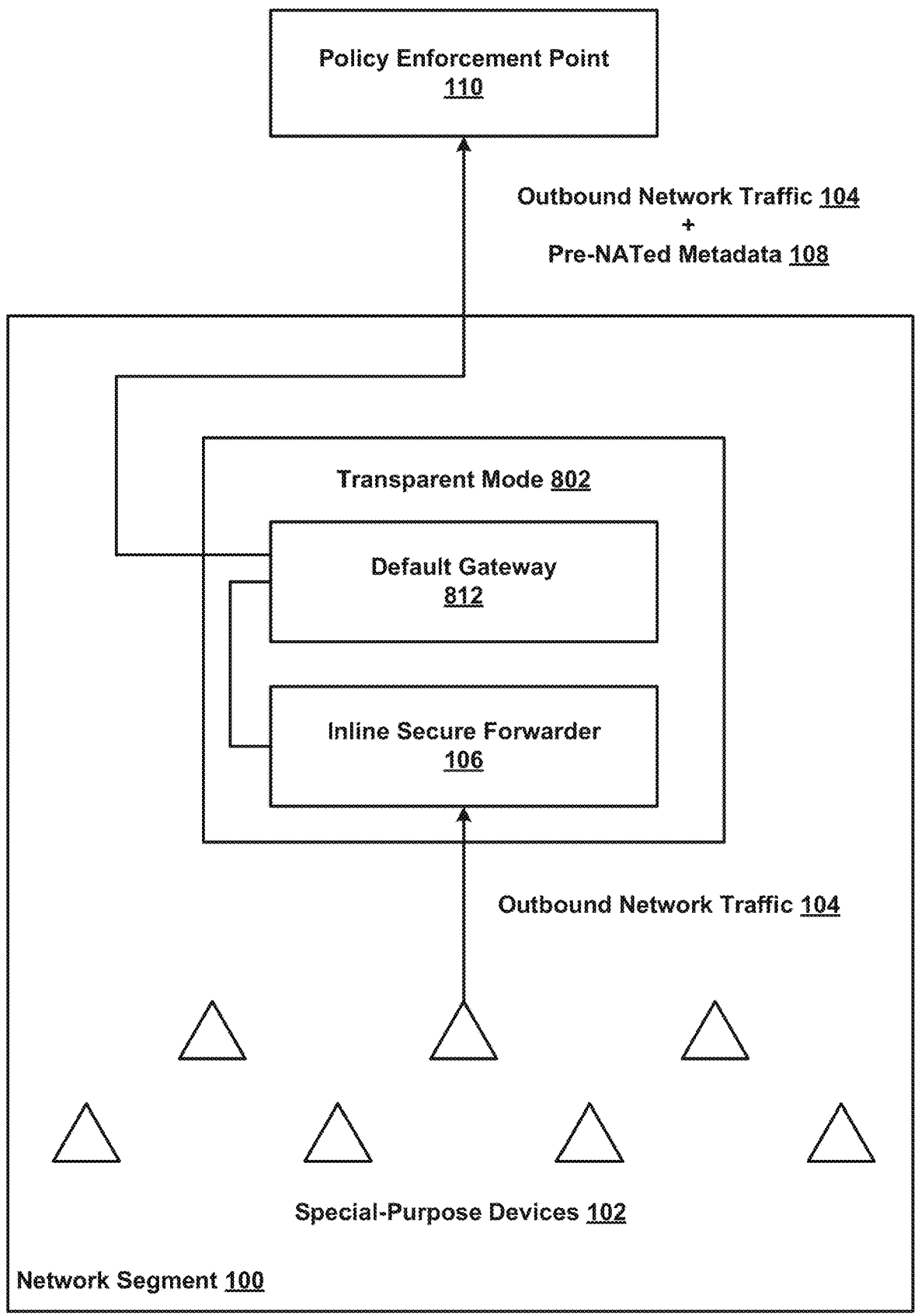
FIG. 8 illustrates one implementation of the disclosed inline secure forwarder operating in a transparent mode to intercept the outbound network traffic.

FIG. 8 illustrates one implementation of the disclosed inline secure forwarder operating 106 in a transparent mode 802 to intercept the outbound network traffic 104. The transparent mode 802 can be setup by configuring the disclosed inline secure forwarder operating 106 physically in front of the default router, with a bypass network interface card (NIC) for failover.

The default gateway 812 of the network segment 100 is configured to receive the outbound network traffic 104 from the special-purpose devices 102.

The disclosed inline secure forwarder 106 is configured to share an Internet Protocol (IP) address with the default gateway 812 in the transparent mode 802 to intercept the outbound network traffic 104 prior to the default gateway 812 receiving the outbound network traffic 104.

The disclosed inline secure forwarder 106 is further configured to route the intercepted outbound network traffic 104 to the policy enforcement point 110 for policy enforcement, via the default proxy.

In one implementation, the disclosed inline secure forwarder 106 is further configured to determine, from the intercepted outbound network traffic 104, the pre-NATed metadata 108 required for the policy enforcement.

Endpoint Configuration

Figure 9:
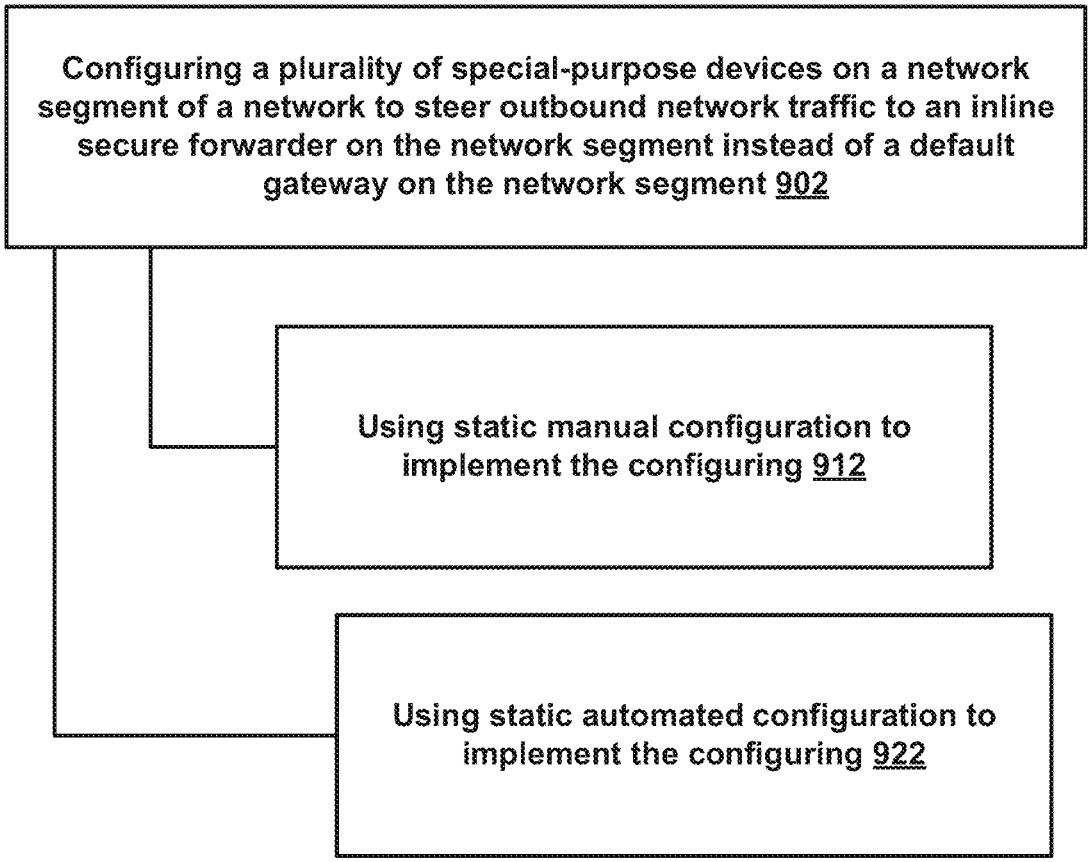
FIG. 9 shows a flow chart of configuring the special-purpose devices to route the outbound network traffic to the disclosed inline secure forwarder instead of the default gateway.

FIG. 9 shows a flow chart of configuring the special-purpose devices 102 to route the outbound network traffic 104 to the disclosed inline secure forwarder 106 instead of the default gateway.

At action 902, the method includes configuring the special-purpose devices 102 on the network segment 100 of a network to steer the outbound network traffic 104 to the disclosed inline secure forwarder 106 on the network segment 100 instead of the default gateway 812 on the network segment 100.

The inline secure forwarder 106 is configured to route the outbound network traffic 104 to the policy enforcement point 110 for a policy enforcement.

At action 912, the method includes using static manual configuration to implement the configuring.

At action 922, the method includes using static automated configuration to implement the configuring. In one implementation, the static automated configuration is executed by a script.

In some implementations, the disclosed inline secure forwarder 106 is further configured to determine, from the outbound network traffic 104, the pre-NATed metadata 108 required for the policy enforcement.

FIG. 10 shows a flow chart of manipulating DHCP responses to cause the special-purpose devices 102 to steer the outbound network traffic 104 to the disclosed inline secure forwarder 106 instead of the default gateway 812.

At action 1002, the method includes manipulating DHCP responses in the network segment 100 of the network to cause a plurality of special-purpose DHCP clients (e.g., the IoT devices) on the network segment 100 to steer the outbound network traffic 104 to the disclosed inline secure forwarder 106 on the network segment 100 instead of the default gateway 812 on the network segment 100. The inline secure forwarder 106 is configured to route the outbound network traffic 104 to the policy enforcement point 110.

Figure 11:
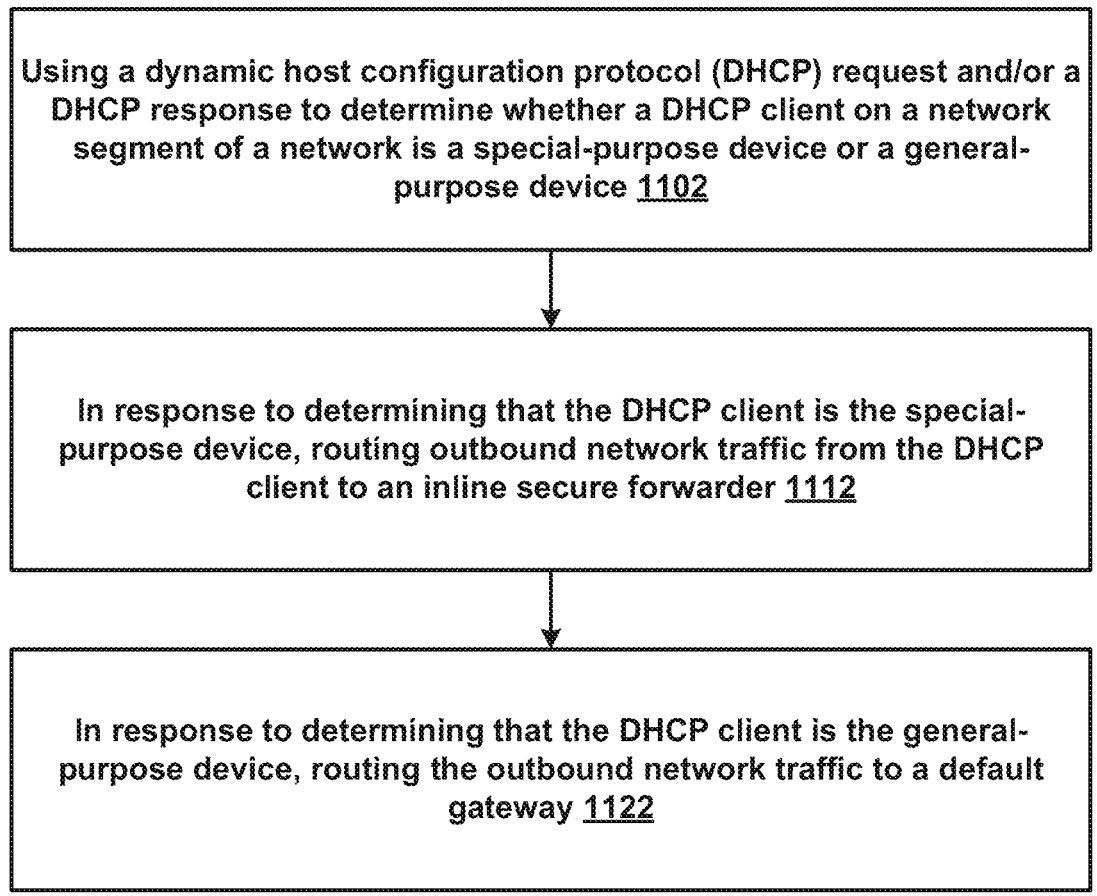
FIG. 11 depicts a flow chart of using DHCP requests and responses to determine whether a DHCP client is a special-purpose device or a general-purpose device.

FIG. 11 depicts a flow chart of using DHCP requests and responses to determine whether a DHCP client is a special-purpose device or a general-purpose device.

At action 1102, the method includes using a DHCP request and/or a DHCP response to determine whether a DHCP client (e.g., a special-purpose device or a general-purposed device) on the network segment 100 of the network is a special-purpose device or a general-purpose device.

At action 1112, the method includes, in response to determining that the DHCP client is the special-purpose device, routing the outbound network traffic 104 from the DHCP client to the disclosed inline secure forwarder 106.

At action 1122, the method includes, in response to determining that the DHCP client is the general-purpose device, routing the outbound network traffic 104 to the default gateway 812.

Computer System

Figure 12:
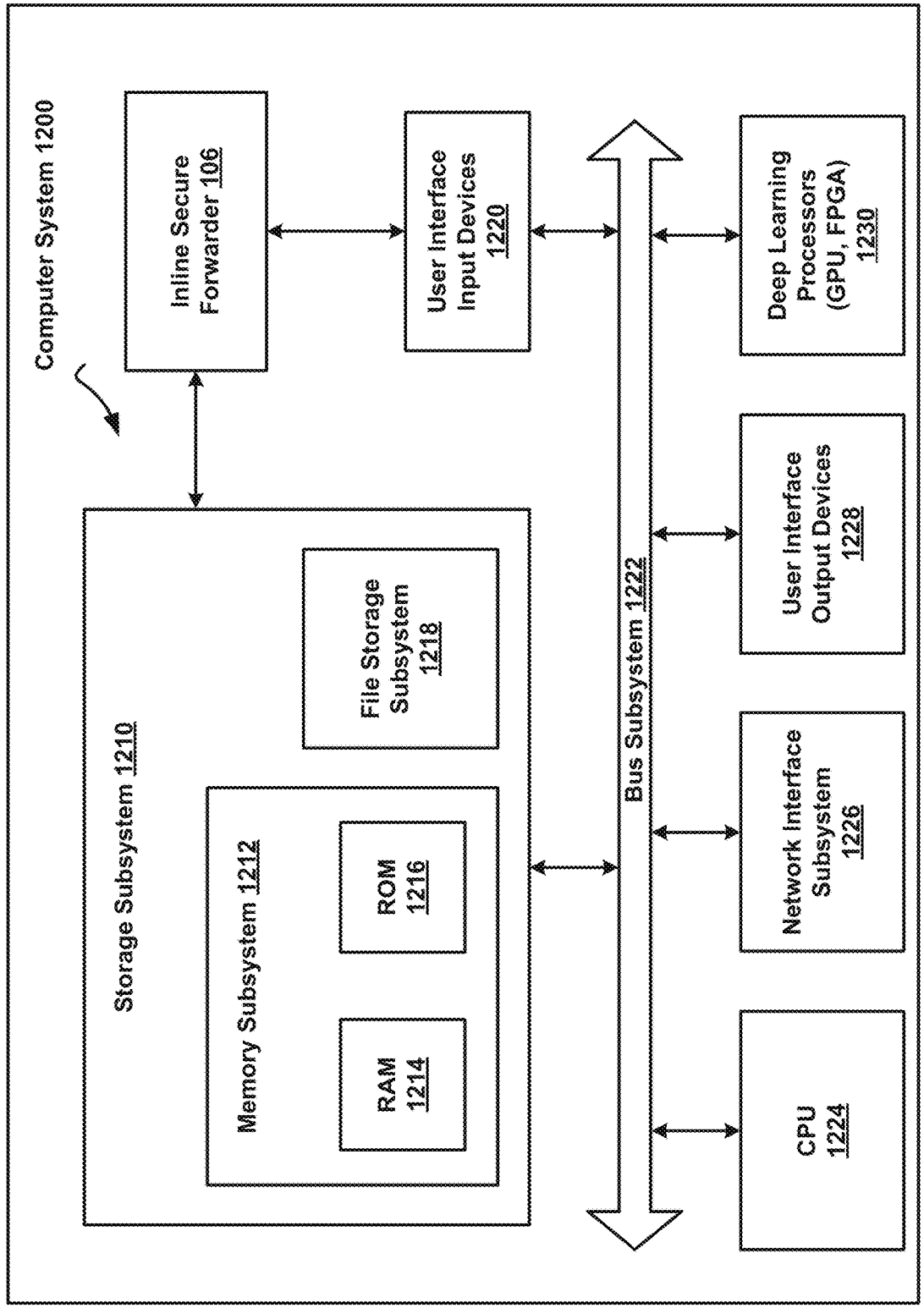
FIG. 12 shows an example computer system that can be used to implement the technology disclosed.

FIG. 12 is an example computer system that can be used to implement various aspects of the disclosed video conferencing system 100. Computer system 1200 includes at least one central processing unit (CPU) 1224 that communicates with a number of peripheral devices via bus subsystem 1222. These peripheral devices can include a storage subsystem 1210 including, for example, memory devices and a file storage subsystem 1218, user interface input devices 1220, user interface output devices 1228, and a network interface subsystem 1226. The input and output devices allow user interaction with computer system 1200. Network interface subsystem 1226 provides an interface to outside networks, including an interface to corresponding interface devices in other computer systems.

In one implementation, the disclosed inline secure forwarder 106 is communicably linked to the storage subsystem 1210 and the user interface input devices 1220.

User interface input devices 1220 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1200.

User interface output devices 1228 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1210 stores programming and data constructs that provide the functionality of some or all of the modules and methods described herein. These software modules are generally executed by processors 1230.

Processors 1230 can be graphics processing units (GPUs), field-programmable gate arrays (FPGAs), application-specific integrated circuits (ASICs), and/or coarse-grained reconfigurable architectures (CGRAs). Processors 1230 can be hosted by a deep learning cloud platform such as Google Cloud Platform™, Xilinx™, and Cirrascale™. Examples of processors 1278 include Google's Tensor Processing Unit (TPU)™, rackmount solutions like GX4 Rackmount Series™, GX12 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1212 used in the storage subsystem 1210 can include a number of memories including a main random access memory (RAM) 1214 for storage of instructions and data during program execution and a read only memory (ROM) 1216 in which fixed instructions are stored. A file storage subsystem 1218 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1218 in the storage subsystem 1210, or in other machines accessible by the processor.

Bus subsystem 1222 provides a mechanism for letting the various components and subsystems of computer system 1200 communicate with each other as intended. Although bus subsystem 1222 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 12 is intended only as a specific example for purposes of illustrating the preferred implementations of the present invention. Many other configurations of computer system 1200 are possible having more or less components than the computer system depicted in FIG. 12.

Clauses

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer-readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These and other features, aspects, and advantages of the technology disclosed will become apparent from the following detailed description of illustrative implementations thereof, which is to be read in connection with the accompanying drawings. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer-readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Steering Logic for Policy Enforcement on IoT Devices

1. A system, comprising:
an in-network intermediary configured to:
receive outbound network traffic from a plurality of special-purpose devices on a network segment of a network, wherein the outbound network traffic is directed at one or more out-of-network servers;
determine, from the outbound network traffic, metadata required for policy enforcement prior to the metadata being masked or modified by the in-network intermediary (e.g., prior to the metadata being masked by network address translation (NAT) by the default gateway or some other processing or translation that causes, for example, the IP address and/or the MAC address being concealed or otherwise lost); and
append the metadata to the outbound network traffic, and send the outbound network traffic appended with the metadata to a policy enforcement point for policy enforcement.

2. The system of clause 1, wherein the metadata includes media access control (MAC) addresses of special-purpose devices in the plurality of special-purpose devices.

3. The system of clause 2, wherein the metadata includes pre-network address translated (pre-NATed) Internet Protocol (IP) addresses of the special-purpose devices.

4. The system of clause 1, wherein the metadata includes information about the network segment.

5. The system of clause 1, further configured to append the metadata to the outbound network traffic on a packet level.

6. The system of clause 1, wherein the policy enforcement point is configured to forward the outbound network traffic to the out-of-network servers in response to classifying the outbound network traffic as benign and/or policy-conforming.

7. The system of clause 6, wherein the policy enforcement point is further configured to block the outbound network traffic in response to classifying the outbound network traffic as malicious and/or policy-non-conforming.

8. The system of clause 1, wherein the policy enforcement point is different from the out-of-network servers.

9. The system of clause 1, wherein the out-of-network servers include cloud applications, web applications, and/or websites.

10. The system of clause 1, wherein the special-purpose devices are configured to steer the outbound network traffic to the in-network intermediary based on static manual configuration.

11. The system of clause 1, wherein the special-purpose devices are configured to steer the outbound network traffic to the in-network intermediary based on static automated configuration.

12. The system of clause 1, wherein the metadata about a particular special-purpose device uniquely identifies the particular special-purpose device.

13. A system, comprising:
a data flow logic configured to route to a policy enforcement point:
outbound network traffic from a device on a network segment of a network; and
metadata that uniquely identifies the device.

14. The system of clause 13, wherein the device is a special-purpose device.

15. The system of clause 13, wherein the device is a general-purpose device.

16. The system of clause 13, wherein the metadata includes a media access control (MAC) address of the device.

17. The system of clause 13, wherein the metadata includes a pre-network address translated (pre-NATed) Internet Protocol (IP) address of the device.

18. The system of clause 13, wherein the metadata includes information about the network segment.

19. The system of clause 13, further configured to append the metadata to the outbound network traffic on a packet level.

20. A system, comprising:
an in-network gateway configured to:
intercept pre-network address translated (pre-NATed) outbound network traffic from a plurality of special-purpose devices on a network segment of a network;
determine, from the pre-NATed outbound network traffic, pre-NATed metadata about the plurality of special-purpose devices; and
make the pre-NATed metadata along with the pre-NATed outbound network traffic available for policy enforcement.

DHCP Relay-Based Steering Logic for Policy Enforcement on IoT Devices

1. A system, comprising:
steering logic interposed between a plurality of special-purpose devices on a network segment of a network and a dynamic host configuration protocol (DHCP) server on the network segment, and configured to:
intercept DHCP requests broadcasted to the DHCP server by special-purpose devices in the plurality of special-purpose devices;
forward the intercepted DHCP requests to the DHCP sever 522, wherein the intercepted DHCP requests include media access control (MAC) addresses of the special-purpose devices;
receive, from the DHCP server, DHCP responses to the intercepted DHCP requests, wherein the received DHCP responses assign, to the special-purpose devices, Internet Protocol (IP) addresses and a default gateway on the network segment;
based on the MAC addresses, the IP addresses, and/or information about the network segment, receive, from a device classification logic, a positive determination that the special-purpose devices are special-purpose devices and not general-purpose devices; and
based on the positive determination, modify the received DHCP responses by replacing the default gateway with an inline secure forwarder on the network segment, and send the modified DHCP responses to the special-purpose devices,
wherein the modified DHCP responses configure the special-purpose devices to steer outbound network traffic to the inline secure forwarder instead of the default gateway, and
wherein the inline secure forwarder is configured to route the outbound network traffic to a policy enforcement point.

2. The system of clause 1, wherein the steering logic is further configured to send the MAC addresses, the IP addresses, and/or the information about the network segment to the device classification logic.

3. The system of clause 2, wherein the device classification logic is configured to use the MAC addresses, the IP addresses, and/or the information about the network segment to categorize the special-purpose devices to one of a plurality of special-purpose device categories.

4. The system of clause 3, wherein the plurality of special-purpose device categories includes an Enterprise Internet of Things (EIoT) device category, an operational technology (OT) device category, an Internet of Medical Things (IoMT) device category, and/or other IoT device category.

5. The system of clause 2, wherein the device classification logic is further configured to use the MAC addresses, the IP addresses, and/or the information about the network segment to determine manufacturing information about the special-purpose devices.

6. The system of clause 5, wherein the manufacturing information identifies manufacturers of the special-purpose devices.

7. The system of clause 2, wherein the device classification logic is further configured to use the MAC addresses, the IP addresses, and/or the information about the network segment to determine software information about the special-purpose devices.

8. The system of clause 7, wherein the software information identifies applications and/or application versions running on the special-purpose devices.

9. The system of clause 2, wherein the device classification logic is further configured to use the MAC addresses, the IP addresses, and/or the information about the network segment to determine functional information about the special-purpose devices.

10. The system of clause 9, wherein the functional information identifies functions of the special-purpose devices.

11. The system of clause 10, wherein the functions include medical functions, premise security functions, scanning functions, and/or sensing functions.

12. The system of clause 3, wherein the device classification logic is further configured to communicate the categorization, the manufacturing information, the software information, and/or the functional information to the steering logic as part of the positive determination.

13. The system of clause 12, wherein the steering logic is further configured to communicate the categorization, the manufacturing information, the software information, and/or the functional information to the inline secure forwarder.

14. The system of clause 13, wherein the inline secure forwarder is further configured to communicate the categorization, the manufacturing information, the software information, and/or the functional information to the policy enforcement point in conjunction with the outbound network traffic.

15. The system of clause 14, wherein the policy enforcement point is configured to use the categorization, the manufacturing information, the software information, and/or the functional information to enforce one or more policies on the outbound network traffic.

16. The system of clause 15, wherein the policy enforcement point is further configured to classify the outbound network traffic as benign and/or policy-conforming based on the enforcement of the policies.

17. The system of clause 16, wherein, based on the benign and/or policy-conforming classification, the policy enforcement point is further configured to send the outbound network traffic to one or more out-of-network destinations intended by the special-purpose devices.

18. The system of clause 17, wherein the out-of-network destinations include cloud applications.

19. The system of clause 18, wherein the out-of-network destinations include web applications and/or websites.

20. The system of clause 15, wherein the policy enforcement point is further configured to classify the outbound network traffic as malicious and/or policy-non-conforming based on the enforcement of the policies.

21. The system of clause 20, wherein the policy enforcement point is further configured to communicate the malicious and/or policy-non-conforming classification to the inline secure forwarder.

22. The system of clause 21, wherein the special-purpose devices are quarantined and removed from the network segment in response to the malicious and/or policy-non-conforming classification.

23. The system of clause 21, wherein the special-purpose devices are subjected to a vulnerability scan in response to the malicious and/or policy-non-conforming classification.

24. The system of clause 23, wherein the vulnerability scan is performed by a third party application programming interface (API).

25. The system of clause 1, wherein the steering logic is further configured to receive, from the device classification logic, a negative determination that the special-purpose devices are general-purpose devices and not special-purpose devices.

26. The system of clause 25, wherein the general-purpose devices include personal computers with Windows operating system, Macintosh operating system, and Linux operating system.

27. The system of clause 25, wherein the device classification logic is further configured to communicate the negative determination to the steering logic.

28. The system of clause 27, wherein the steering logic is further configured to not modify the received DHCP responses based on the negative determination.

29. The system of clause 28, wherein, based on the negative determination, the outbound network traffic is sent to the policy enforcement point via the inline secure forwarder to enforce one or more policies on the outbound network traffic.

30. The system of clause 1, wherein the steering logic runs on a DHCP relay.

31. The system of clause 30, wherein the DHCP relay is on the network segment.

32. The system of clause 1, wherein the special-purpose devices are Internet of Things (IoT) devices.

33. The system of clause 1, wherein the special-purpose devices are operational technology (OT) devices.

34. The system of clause 1, wherein the special-purpose devices are industrial Internet of Things (IIoT) devices.

35. The system of clause 1, wherein the special-purpose devices are industrial control system (ICS) devices.

36. The system of clause 1, wherein the special-purpose devices are Internet of Medical Things (IoMT) devices.

37. The system of clause 1, wherein the policy enforcement point is a cloud service.

38. The system of clause 1, wherein the policy enforcement point is an on-premise service.

39. The system of clause 1, wherein the policy enforcement point is outside the network.

40. The system of clause 1, wherein the policy enforcement point is inside the network.

41. The system of clause 2, wherein the device classification logic is located on a mirrored port.

42. The system of clause 41, wherein the mirrored port is outside the network.

43. The system of clause 41, wherein the mirrored port is inside the network.

44. The system of clause 1, wherein the outbound network traffic is North-South traffic.

45. The system of clause 1, wherein the inline secure forwarder is further configured to route the outbound network traffic to the policy enforcement point over a secure tunnel.

46. The system of clause 45, wherein the secure tunnel is encrypted.

47. The system of clause 1, wherein the IP addresses are pre-network address translation (NAT) IP addresses.

48. The system of clause 47, wherein the default gateway uses the NAT to translate the IP addresses into a public IP address.

49. The system of clause 1, wherein the steering logic is further configured to communicate with the device classification logic over an API.

50. The system of clause 1, wherein the inline secure forwarder is a proxy.

51. The system of clause 50, wherein the inline secure forwarder is a forward proxy.

52. The system of clause 1, wherein the inline secure forwarder is a software logic running on one or more network components on the network segment.

53. The system of clause 52, wherein the inline secure forwarder is a dedicated network component on the network segment.

54. The system of clause 1, wherein the information about the network segment includes a name of the network segment.

55. The system of clause 1, wherein the policy enforcement point runs on the inline secure forwarder.

56. The system of clause 1, wherein the inline secure forwarder is further configured to append the MAC addresses, the IP addresses, and/or the information about the network segment to the outbound network traffic at a packet level.

57. The system of clause 56, wherein the inline secure forwarder is further configured to transmit, to the policy enforcement point, the packets of the outbound network traffic appended with the MAC addresses, the IP addresses, and/or the information about the network segment.

58. The system of clause 13, wherein the inline secure forwarder is further configured to append the categorization, the manufacturing information, the software information, and/or the functional information to the outbound network traffic at a packet level.

59. The system of clause 58, wherein the inline secure forwarder is further configured to transmit, to the policy enforcement point, the packets of the outbound network traffic appended with the categorization, the manufacturing information, the software information, and/or the functional information.

60. The system of clause 1, wherein the device classification logic is a rule-based logic.

61. The system of clause 1, wherein the device classification logic is a machine learning-based logic.

DHCP Server-Based Steering Logic for Policy Enforcement on IoT Devices

1. A system, comprising:
   steering logic running on a dynamic host configuration protocol (DHCP) server on a network segment of a network, and configured to:
   receive DHCP requests broadcasted to the DHCP server by a plurality of special-purpose devices on the network segment, wherein the received DHCP requests include media access control (MAC) addresses of special-purpose devices in the plurality of special-purpose devices;
   access DHCP responses generated by the DHCP server for the DHCP requests, wherein the accessed DHCP responses assign, to the special-purpose devices, Internet Protocol (IP) addresses and a default gateway on the network segment;
   based on the MAC addresses, the IP addresses, and/or information about the network segment, receive, from a device classification logic, a positive determination that the special-purpose devices are special-purpose devices and not general-purpose devices; and based on the positive determination, modify the accessed DHCP responses by replacing the default gateway with an inline secure forwarder on the network segment, and send the modified DHCP responses to the special-purpose devices, wherein the modified DHCP responses configure the special-purpose devices to steer outbound network traffic to the inline secure forwarder instead of the default gateway, and wherein the inline secure forwarder is configured to route the outbound network traffic to a policy enforcement point.

2. The system of clause 1, wherein the steering logic is further configured to send the MAC addresses, the IP addresses, and/or the information about the network segment to the device classification logic.

3. The system of clause 2, wherein the device classification logic is configured to use the MAC addresses, the IP addresses, and/or the information about the network segment to categorize the special-purpose devices to one of a plurality of special-purpose device categories.

4. The system of clause 3, wherein the plurality of special-purpose device categories includes an Enterprise Internet of Things (EIoT) device category, an operational technology (OT) device category, an Internet of Medical Things (IoMT) device category, and/or other IoT device category.

5. The system of clause 2, wherein the device classification logic is further configured to use the MAC addresses, the IP addresses, and/or the information about the network segment to determine manufacturing information about the special-purpose devices.

6. The system of clause 5, wherein the manufacturing information identifies manufacturers of the special-purpose devices.

7. The system of clause 2, wherein the device classification logic is further configured to use the MAC addresses, the IP addresses, and/or the information about the network segment to determine software information about the special-purpose devices.

8. The system of clause 7, wherein the software information identifies applications and/or application versions running on the special-purpose devices.

9. The system of clause 2, wherein the device classification logic is further configured to use the MAC addresses, the IP addresses, and/or the information about the network segment to determine functional information about the special-purpose devices.

10. The system of clause 9, wherein the functional information identifies functions of the special-purpose devices.

11. The system of clause 10, wherein the functions include medical functions, premise security functions, scanning functions, and/or sensing functions.

12. The system of clause 3, wherein the device classification logic is further configured to communicate the categorization, the manufacturing information, the software information, and/or the functional information to the steering logic as part of the positive determination.

13. The system of clause 12, wherein the steering logic is further configured to communicate the categorization, the manufacturing information, the software information, and/or the functional information to the inline secure forwarder.

14. The system of clause 13, wherein the inline secure forwarder is further configured to communicate the categorization, the manufacturing information, the software information, and/or the functional information to the policy enforcement point in conjunction with the outbound network traffic.

15. The system of clause 14, wherein the policy enforcement point is configured to use the categorization, the manufacturing information, the software information, and/or the functional information to enforce one or more policies on the outbound network traffic.

16. The system of clause 15, wherein the policy enforcement point is further configured to classify the outbound network traffic as benign and/or policy-conforming based on the enforcement of the policies.

17. The system of clause 16, wherein, based on the benign and/or policy-conforming classification, the policy enforcement point is further configured to send the outbound network traffic to one or more out-of-network destinations intended by the special-purpose devices.

18. The system of clause 17, wherein the out-of-network destinations include cloud applications.

19. The system of clause 18, wherein the out-of-network destinations include web applications and/or websites.

20. The system of clause 15, wherein the policy enforcement point is further configured to classify the outbound network traffic as malicious and/or policy-non-conforming based on the enforcement of the policies.

Transparent Inline Secure Forwarder for Policy Enforcement on IoT Devices

1. A system, comprising:
   a plurality of special-purpose devices on a network segment of a network;
   a default gateway of the network segment configured to receive outbound network traffic from special-purpose devices in the plurality of special-purpose devices; and
   an inline secure forwarder configured to:
      share an Internet Protocol (IP) address with the default gateway in a transparent mode to intercept the outbound network traffic prior to the default gateway receiving the outbound network traffic; and
      route the intercepted outbound network traffic to a policy enforcement point for policy enforcement.

2. The system of clause 1, wherein the inline secure forwarder is further configured to determine, from the intercepted outbound network traffic, metadata required for the policy enforcement.

3. The system of clause 2, wherein the metadata about a particular special-purpose device uniquely identifies the particular special-purpose device.

4. The system of clause 3, wherein the metadata includes media access control (MAC) addresses of the special-purpose devices.

5. The system of clause 3, wherein the metadata includes pre-network address translated (pre-NATed) IP addresses of the special-purpose devices.

6. The system of clause 3, wherein the metadata includes information about the network segment.

7. The system of clause 2, wherein the inline secure forwarder is further configured to append the metadata to the intercepted outbound network traffic, and send the intercepted outbound network traffic appended with the metadata to the policy enforcement point for the policy enforcement.

8. The system of clause 7, wherein the inline secure forwarder is further configured to append the metadata to the intercepted outbound network traffic on a packet level.

9. The system of clause 2, wherein the inline secure forwarder is further configured to send the metadata to a device classification logic.

10. The system of clause 9, wherein, based on the metadata, the inline secure forwarder is further configured to receive, from the device classification logic, a positive determination that the special-purpose devices are special-purpose devices and not general-purpose devices.

11. The system of clause 10, wherein the device classification logic is configured to use the metadata to categorize the special-purpose devices to one of a plurality of special-purpose device categories.

12. The system of clause 11, wherein the plurality of special-purpose device categories includes an Enterprise Internet of Things (EIoT) device category, an operational technology (OT) device category, an Internet of Medical Things (IoMT) device category, and/or other IoT device category.

13. The system of clause 12, wherein the policy enforcement point is configured to classify the intercepted outbound network traffic as benign and/or policy-conforming based on the metadata and/or the categorization.

14. The system of clause 13, wherein, based on the benign and/or policy-conforming classification, the policy enforcement point is further configured to send the intercepted outbound network traffic to one or more out-of-network destinations intended by the special-purpose devices.

15. The system of clause 14, wherein the out-of-network destinations include cloud applications.

16. The system of clause 14, wherein the out-of-network destinations include web applications.

17. The system of clause 14, wherein the out-of-network destinations include websites.

18. The system of clause 12, wherein the policy enforcement point is further configured to classify the intercepted outbound network traffic as malicious and/or policy-non-conforming based on the metadata and/or the categorization.

19. The system of clause 18, wherein, based on the malicious and/or policy-non-conforming classification, the policy enforcement point is further configured to block the intercepted outbound network traffic.

20. The system of clause 1, wherein the policy enforcement point is a cloud service.

Configuring IoT Devices for Policy Enforcement

1. A computer-implemented method, including:
configuring a plurality of special-purpose devices on a network segment of a network to steer outbound network traffic to an inline secure forwarder on the network segment instead of a default gateway on the network segment, wherein the inline secure forwarder is configured to route the outbound network traffic to a policy enforcement point for a policy enforcement.

2. The computer-implemented method of clause 1, further including using static manual configuration to implement the configuring.

3. The computer-implemented method of clause 1, further including using static automated configuration to implement the configuring.

4. The computer-implemented method of clause 3, wherein the static automated configuration is executed by a script.

5. The computer-implemented method of clause 1, wherein the inline secure forwarder is further configured to determine, from the outbound network traffic, metadata required for the policy enforcement.

6. The computer-implemented method of clause 5, wherein the metadata about a particular special-purpose device uniquely identifies the particular special-purpose device.

7. The computer-implemented method of clause 5, wherein the metadata includes media access control (MAC) addresses of special-purpose devices in the plurality of special-purpose devices.

8. The computer-implemented method of clause 5, wherein the metadata includes pre-network address translated (pre-NATed) IP addresses of the special-purpose devices.

9. The computer-implemented method of clause 5, wherein the metadata includes information about the network segment.

10. The computer-implemented method of clause 5, wherein the inline secure forwarder is further configured to append the metadata to the outbound network traffic, and send the outbound network traffic appended with the metadata to the policy enforcement point for the policy enforcement.

11. The computer-implemented method of clause 10, wherein the inline secure forwarder is further configured to append the metadata to the outbound network traffic on a packet level.

12. The computer-implemented method of clause 5, wherein the policy enforcement point is configured to classify the outbound network traffic as benign and/or policy-conforming based on the metadata.

13. The computer-implemented method of clause 12, wherein, based on the benign and/or policy-conforming classification, the policy enforcement point is further configured to send the outbound network traffic to one or more out-of-network destinations intended by the special-purpose devices.

14. The computer-implemented method of clause 13, wherein the out-of-network destinations include cloud applications.

15. The computer-implemented method of clause 13, wherein the out-of-network destinations include web applications and/or websites.

16. The computer-implemented method of clause 5, wherein the policy enforcement point is further configured to classify the outbound network traffic as malicious and/or policy-non-conforming based on the metadata.

17. The computer-implemented method of clause 16, wherein, based on the malicious and/or policy-non-conforming classification, the policy enforcement point is further configured to block the outbound network traffic.

18. The computer-implemented method of clause 1, wherein the policy enforcement point is a cloud service.

19. A computer-implemented method, including:
manipulating dynamic host configuration protocol (DHCP) responses in a network segment of a network to cause a plurality of special-purpose DHCP clients on the network segment to steer outbound network traffic to an inline secure forwarder on the network segment instead of a default gateway on the network segment, wherein the inline secure forwarder is configured to route the outbound network traffic to a policy enforcement point.

20. A computer-implemented method, including:
using a dynamic host configuration protocol (DHCP) request and/or a DHCP response to determine whether a DHCP client on a network segment of a network is a special-purpose device or a general-purpose device;
in response to determining that the DHCP client is the special-purpose device, routing outbound network traffic from the DHCP client to an inline secure forwarder; and in response to determining that the DHCP client is the general-purpose device, routing the outbound network traffic to a default gateway.

What is claimed is:

1. A system, comprising:
steering logic running on a dynamic host configuration protocol (DHCP) server on a network segment of a network, and configured to:
  receive DHCP requests broadcasted to the DHCP server by a plurality of special-purpose devices on the network segment, wherein the received DHCP requests include media access control (MAC) addresses of special-purpose devices in the plurality of special-purpose devices;
  access DHCP responses generated by the DHCP server for the DHCP requests, wherein the accessed DHCP responses assign, to the special-purpose devices, Internet Protocol (IP) addresses and a default gateway on the network segment;
  based on device information, receive, from a device classification logic, a positive determination that the special-purpose devices are special-purpose devices and not general-purpose devices, wherein the device information comprises the MAC address of the special-purpose devices, the IP address of the special purpose devices, information about the network segment of the special-purpose devices, or a combination thereof; and
  based on the positive determination:
    modify the accessed DHCP responses by replacing the default gateway with an inline secure forwarder on the network segment,
    transmit the modified DHCP responses to the special-purpose devices
    to configure the special-purpose devices to steer outbound network traffic to the inline secure forwarder instead of the default gateway, and
    transmit pre-network address translation (pre-NATed) metadata for the special purpose devices to the inline secure forwarder,
    wherein the inline secure forwarder is configured to route the outbound network traffic to a policy enforcement point.

2. The system of claim 1, wherein the pre-NATed metadata for the special purpose devices comprises the MAC address of the special-purpose devices, the IP address of the special purpose devices, information about the network segment of the special-purpose devices, and device classification data of the special purpose devices.

3. The system of claim 1, wherein the steering logic is further configured to send the device information to the device classification logic.

4. The system of claim 3, wherein the device classification logic is configured to use the device information to categorize the special-purpose devices to one of a plurality of special-purpose device categories.

5. The system of claim 4, wherein the plurality of special-purpose device categories includes an Enterprise Internet of Things (EIoT) device category, an operational technology (OT) device category, an Internet of Medical Things (IoMT) device category, and/or other IoT device category.

6. The system of claim 3, wherein the device classification logic is further configured to use the device information to determine manufacturing information about the special-purpose devices.

7. The system of claim 6, wherein the manufacturing information identifies manufacturers of the special-purpose devices.

8. The system of claim 3, wherein the device classification logic is further configured to use the device information to determine software information about the special-purpose devices.

9. The system of claim 8, wherein the software information identifies applications, application versions, or a combination thereof running on the special-purpose devices.

10. The system of claim 3, wherein the device classification logic is further configured to use the device information to determine functional information about the special-purpose devices.

11. The system of claim 10, wherein the functional information identifies functions of the special-purpose devices.

12. The system of claim 11, wherein the functions include medical functions, premise security functions, scanning functions, sensing functions, or a combination thereof.

13. The system of claim 4, wherein the device classification logic is further configured to communicate classification information comprising the categorization, manufacturing information, software information, functional information, or a combination thereof to the steering logic as part of the positive determination.

14. The system of claim 13, wherein the steering logic is further configured to communicate the classification information to the inline secure forwarder.

15. The system of claim 14, wherein the inline secure forwarder is further configured to communicate the classification information to the policy enforcement point in conjunction with the outbound network traffic.

16. The system of claim 15, wherein the policy enforcement point is configured to use the classification information to enforce one or more policies on the outbound network traffic.

17. The system of claim 16, wherein the policy enforcement point is further configured to classify the outbound network traffic as policy-conforming based on the enforcement of the policies.

18. The system of claim 17, wherein, based on the policy-conforming classification, the policy enforcement point is further configured to send the outbound network traffic to one or more out-of-network destinations intended by the special-purpose devices.

19. The system of claim 18, wherein the out-of-network destinations include cloud applications.

20. The system of claim 19, wherein the out-of-network destinations include web applications, websites, or a combination thereof.

* * * * *